(12) United States Patent
Hotta et al.

(10) Patent No.: US 10,982,621 B2
(45) Date of Patent: Apr. 20, 2021

(54) ENGINE SYSTEM CONTROL APPARATUS AND ENGINE SYSTEM

(71) Applicant: MITSUBISHI HEAVY INDUSTRIES, LTD., Tokyo (JP)

(72) Inventors: Kazuro Hotta, Tokyo (JP); Hideaki Nagamochi, Tokyo (JP); Go Tomatsu, Tokyo (JP); Takahiro Yamashina, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 32 days.

(21) Appl. No.: 16/472,293

(22) PCT Filed: Dec. 26, 2017

(86) PCT No.: PCT/JP2017/046613
§ 371 (c)(1),
(2) Date: Jun. 21, 2019

(87) PCT Pub. No.: WO2018/124061
PCT Pub. Date: Jul. 5, 2018

(65) Prior Publication Data
US 2020/0309059 A1 Oct. 1, 2020

(30) Foreign Application Priority Data
Dec. 26, 2016 (JP) .............................. JP2016-251733

(51) Int. Cl.
*F02D 43/00* (2006.01)
*F02B 37/00* (2006.01)
(Continued)

(52) U.S. Cl.
CPC .............. *F02D 43/00* (2013.01); *F02B 37/00* (2013.01); *F02B 37/18* (2013.01); *F02B 37/24* (2013.01)

(58) Field of Classification Search
CPC .......... F02D 43/00; F02B 37/24; F02B 37/00; F02B 37/18; F02B 37/004; F02B 37/013
See application file for complete search history.

(56) References Cited

U.S. PATENT DOCUMENTS

| 2002/0056444 A1 | 5/2002 | Chou et al. | |
| 2015/0059337 A1* | 3/2015 | Wang | F02B 37/186 60/602 |
| 2015/0068203 A1* | 3/2015 | Wang | F02B 37/004 60/600 |

FOREIGN PATENT DOCUMENTS

| JP | 2-131033 U | 10/1990 |
| JP | 4295904 B2 | 7/2009 |
| JP | 2015-81567 A | 4/2015 |

OTHER PUBLICATIONS

International Search Report, dated Mar. 13, 2018, for International Application No. PCT/JP2017/046613, with an English translation.
(Continued)

*Primary Examiner* — Audrey K Bradley
*Assistant Examiner* — Edward Bushard
(74) *Attorney, Agent, or Firm* — Birch, Stewart, Kolasch & Birch, LLP

(57) ABSTRACT

An engine system control apparatus includes a parameter reception unit that receives parameters necessary for acquiring a pressure ratio of the low-pressure compressor and a pressure ratio of the high-pressure compressor, a pressure ratio acquisition unit that acquires the pressure ratio of the low-pressure compressor and the pressure ratio of the high-pressure compressor based on the parameters, an inter-compressor pressure ratio acquisition unit that acquires an inter-compressor pressure ratio obtainable by dividing the pressure ratio of the high-pressure compressor by the pressure ratio of the low-pressure compressor, and a control unit that controls the exhaust gas flowrate adjustment unit such
(Continued)

that the inter-compressor pressure ratio becomes a predetermined pressure ratio for optimizing an operation efficiency of the engine system.

9 Claims, 15 Drawing Sheets

(51) Int. Cl.
*F02B 37/18* (2006.01)
*F02B 37/24* (2006.01)

(56) References Cited

OTHER PUBLICATIONS

Written Opinion of the International Searching Authority dated Mar. 13, 2018, for International Application No. PCT/JP2017/046613, with an English Translation.

\* cited by examiner

ENGINE SYSTEM CONTROL APPARATUS AND ENGINE SYSTEM

TECHNICAL FIELD

The present invention relates to an engine system control apparatus and an engine system.

Priority is claimed on Japanese Patent Application No. 2016-251733, filed on Dec. 26, 2016, the content of which is incorporated herein by reference.

BACKGROUND ART

As an engine system mounted on a ship or a vehicle, it is desirable that the engine have high responsiveness at a time of acceleration of the engine and be capable of withstanding a high load at a time of normal operation.

In order to obtain high responsiveness of the engine at the time of the acceleration, for example, it is effective to reduce the opening of the turbine nozzle of the turbocharger in the engine system. On the other hand, at the time of full load operation, it is necessary to suppress a rotational speed of the turbocharger and an air supply pressure and to suppress the load on the turbocharger and the cylinder.

In Patent Document 1, an exhaust bypass device is disclosed which includes a bypass line for venting air in front of the turbine and a valve provided in the bypass line.

In Patent Document 1, a method is disclosed in which it is possible to improve the responsiveness of the engine at the time of acceleration and is capable of withstanding a high load at the time of normal operation by opening and closing the valve.

CITATION LIST

Patent Document

Patent Document 1: Japanese Unexamined Patent Application, First Publication No. H02-131033

SUMMARY OF INVENTION

Technical Problem

In order to increase the pressure of air supplied to an engine, there is an engine system in which a two-stage turbocharger each includes a compressor and a turbine. In recent years, it has been desirable to further improve fuel efficiency of such an engine system provided with a two-stage turbocharger.

Therefore, the present invention has an object of providing an engine system control apparatus and an engine system that have a two-stage turbocharger and can improve fuel efficiency.

Solution to Problem

In order to solve the problems described above, according to an engine system control apparatus in an aspect of the present invention, the apparatus controls an engine system including an engine, a low-pressure compressor configured to compress suction air, a high-pressure compressor configured to further compress the suction air compressed by the low-pressure compressor and supply the resultant to the engine, a high-pressure turbine configured to be driven by exhaust gas discharged from the engine and rotationally drive the high-pressure compressor, a low-pressure turbine configured to be driven by exhaust gas discharged from the high-pressure turbine and rotationally drive the low-pressure compressor, and an exhaust gas flowrate adjustment unit configured to adjust a flowrate of the exhaust gas passing through at least one of the high-pressure turbine and the low-pressure turbine. The engine system control apparatus includes a parameter reception unit configured to receive parameters necessary for acquiring a pressure ratio of the low-pressure compressor and a pressure ratio of the high-pressure compressor; a pressure ratio acquisition unit configured to acquire the pressure ratio of the low-pressure compressor and the pressure ratio of the high-pressure compressor based on the parameters; an inter-compressor pressure ratio acquisition unit configured to acquire an inter-compressor pressure ratio obtainable based on the pressure ratio of the low-pressure compressor and the pressure ratio of the high-pressure compressor; and a control unit configured to control the exhaust gas flowrate adjustment unit such that the inter-compressor pressure ratio becomes a predetermined pressure ratio for optimizing an operation efficiency of the engine system.

According to the present invention, since the apparatus includes the parameter reception unit, the pressure ratio acquisition unit, the inter-compressor pressure ratio acquisition unit, and the control unit, it is possible to control the exhaust gas flowrate adjustment unit such that the inter-compressor pressure ratio becomes a predetermined pressure ratio for optimizing the operation efficiency of the engine system.

As a result, it is possible to improve the fuel efficiency of the engine system provided with the two-stage turbocharger (Specifically, the turbocharger configured with the low-pressure compressor and the low-pressure turbine, and the turbocharger configured with the high-pressure compressor and the high-pressure turbine).

In addition, the engine system control apparatus according to the aspect of the present invention may further include an operation curve storage unit configured to store operation curves indicating a relationship between the inter-compressor pressure ratio and the operation efficiency of the engine system. The control unit may control the exhaust gas flowrate adjustment unit such that the inter-compressor pressure ratio obtained when the operation efficiency of the engine system is highest among the operation curves becomes the predetermined pressure ratio.

As described above, since the apparatus includes the exhaust gas flowrate adjustment unit such that the inter-compressor pressure ratio obtained when the operation efficiency of the engine system is highest among the operation curves becomes the predetermined pressure ratio, it is possible to improve the fuel efficiency of an engine system having a two-stage turbocharger.

In addition, in the engine system control apparatus according to the aspect of the present invention, the operation curve storage unit may be connected to the engine and may store a plurality of operation curves corresponding to a temperature at a predetermined position on a supply line where the low-pressure compressor and the high-pressure compressor are provided. The control unit may use the operation curve corresponding to the temperature at the predetermined position among the plurality of operation curves.

As described above, since the apparatus includes the control unit configured to use the operation curve corresponding to the temperature at the predetermined position among the plurality of operation curves, it is possible to further improve the fuel efficiency of the engine system having the two-stage turbocharger.

According to the engine system control apparatus in the aspect of the present invention, the parameter reception unit may receive an inlet side pressure of the high-pressure compressor and an outlet side pressure of the high-pressure compressor. The pressure ratio acquisition unit may use the atmospheric pressure as the inlet side pressure of the low-pressure compressor.

As described above, since the parameter reception unit receives the inlet side pressure of the high-pressure compressor and the outlet side pressure of the high-pressure compressor, and the pressure ratio acquisition unit uses the atmospheric pressure as the suction pressure of the low-pressure compressor, the pressure ratio of the low-pressure compressor can be acquired. Therefore, it is possible to acquire the inter-compressor pressure ratio.

According to the engine system control apparatus in the aspect of the present invention, the parameter reception unit may receive an inlet side pressure of the high-pressure compressor, an outlet side pressure of the high-pressure compressor, the atmospheric pressure, and the rotational frequency of the low-pressure compressor. The pressure ratio acquisition unit may estimate the inlet side pressure of the low-pressure compressor based on the inlet side pressure of the high-pressure compressor, the atmospheric pressure, and the rotational frequency of the low-pressure compressor, and may acquire the pressure ratio of the low-pressure compressor based on the estimated inlet side pressure of the low-pressure compressor and the inlet side pressure of the high-pressure compressor.

As described above, by estimating the inlet side pressure of the low-pressure compressor based on the inlet side pressure of the high-pressure compressor, the atmospheric pressure, and the rotational frequency of the low-pressure compressor, and by acquiring the pressure ratio of the low-pressure compressor based on the estimated inlet side pressure of the low-pressure compressor and the inlet side pressure of the high-pressure compressor (the outlet side pressure of the low-pressure compressor), the accuracy of the pressure ratio of the low-pressure compressor can be increased. Therefore, it is possible to further improve the fuel efficiency of the engine system having the two-stage turbocharger.

According to the engine system control apparatus in the aspect of the present invention, the control unit may control the exhaust gas flowrate adjustment unit such that the pressure ratio becomes the predetermined pressure ratio when it is desirable to improve the fuel efficiency of the engine system. The control system may perform the control on the exhaust gas flowrate adjustment unit to be fully closed when it is desirable to increase the response speed of the engine, and may perform the control on the exhaust gas flowrate adjustment unit to be fully open when it is desirable to protect the engine from the compressed suction air discharged from the high-pressure compressor.

Since the apparatus includes the control unit performing such a control as described above, it is possible to improve the fuel efficiency of the engine system, to increase the response speed of the engine, and to protect the engine.

An engine system according to the aspect of the present invention may include the engine system control apparatus, the engine, a high-pressure turbocharger including the high-pressure compressor and the high-pressure turbine that are connected to the engine, a low-pressure turbocharger including the low-pressure compressor and the low-pressure turbine that are connected to the high-pressure turbocharger, a first rotation shaft connecting the low-pressure compressor and the low-pressure turbine, a second rotation shaft connecting the high-pressure compressor and the high-pressure turbine, the exhaust gas flowrate adjustment unit that is electrically connected to the engine system control apparatus, a supply line that is connected to the engine, and on which the low-pressure compressor and the high-pressure compressor are provided, an exhaust line that is connected to the engine, and on which the low-pressure turbine and the high-pressure turbine are provided, a first pressure detection unit configured to detect an inlet side pressure of the high-pressure compressor and transmit information on the detected pressure to the engine system control apparatus, and a second pressure detection unit configured to detect an outlet side pressure of the high pressure-compressor and transmit information on the detected pressure to the engine system control apparatus.

Since the engine system includes the engine system control apparatus described above, it is possible to improve the fuel efficiency of the engine system.

The engine system according to the aspect of the invention may further include a temperature detection unit configured to detect a temperature of the suction air flowing at a predetermined position of the supply line and transmit information on the detected temperature to the engine system control apparatus.

Since the engine system includes the temperature detection unit having the above-described configuration, it is possible to control the exhaust gas flowrate adjustment unit using the operation curve corresponding to the temperature of the suction air.

The engine system according to the aspect of the invention may further include a rotational frequency detection unit configured to detect the rotational frequency of the first rotation shaft and transmit information on the detected rotational frequency to the engine system control apparatus.

Since the engine system includes the rotational frequency detection unit having the above-described configuration, it is possible to estimate the inlet side pressure of the low-pressure compressor based on the inlet side pressure of the high-pressure compressor, the outlet side pressure of the high-pressure compressor, and the rotational frequency of the low-pressure compressor.

According to the engine system in the aspect of the present invention, the exhaust gas flowrate adjustment unit may include a bypass line of which both ends are connected to the exhaust line so as to bypass at least one of the low-pressure turbine and the high-pressure turbine, and a valve that is provided on the bypass line and electrically connected to the control unit.

As described above, the exhaust gas flowrate adjustment unit can be configured with a bypass line of which both ends are connected to the exhaust line, and which bypasses at least one of the low-pressure turbine and the high-pressure turbine, and a valve that is provided on the bypass line and electrically connected to the control unit.

According to the engine system in the aspect of the present invention, the low-pressure turbine and the high-pressure turbine may respectively include a turbine main body, and the exhaust gas flowrate adjustment unit may be a variable nozzle provided inside the turbine main body of at least one of the low-pressure turbine and the high-pressure turbine.

As described above, the variable nozzle provided inside of at least one of the low-pressure turbine and the high-pressure turbine can be used as the exhaust gas flowrate adjustment unit.

Advantageous Effects of Invention

According to the present invention, it is possible to improve the fuel efficiency of an engine system having a two-stage turbocharger.

DESCRIPTION OF EMBODIMENTS

Hereinafter, embodiments to which the present invention is applied will be described in detail with reference to the drawings.

First Embodiment

Figure 1:
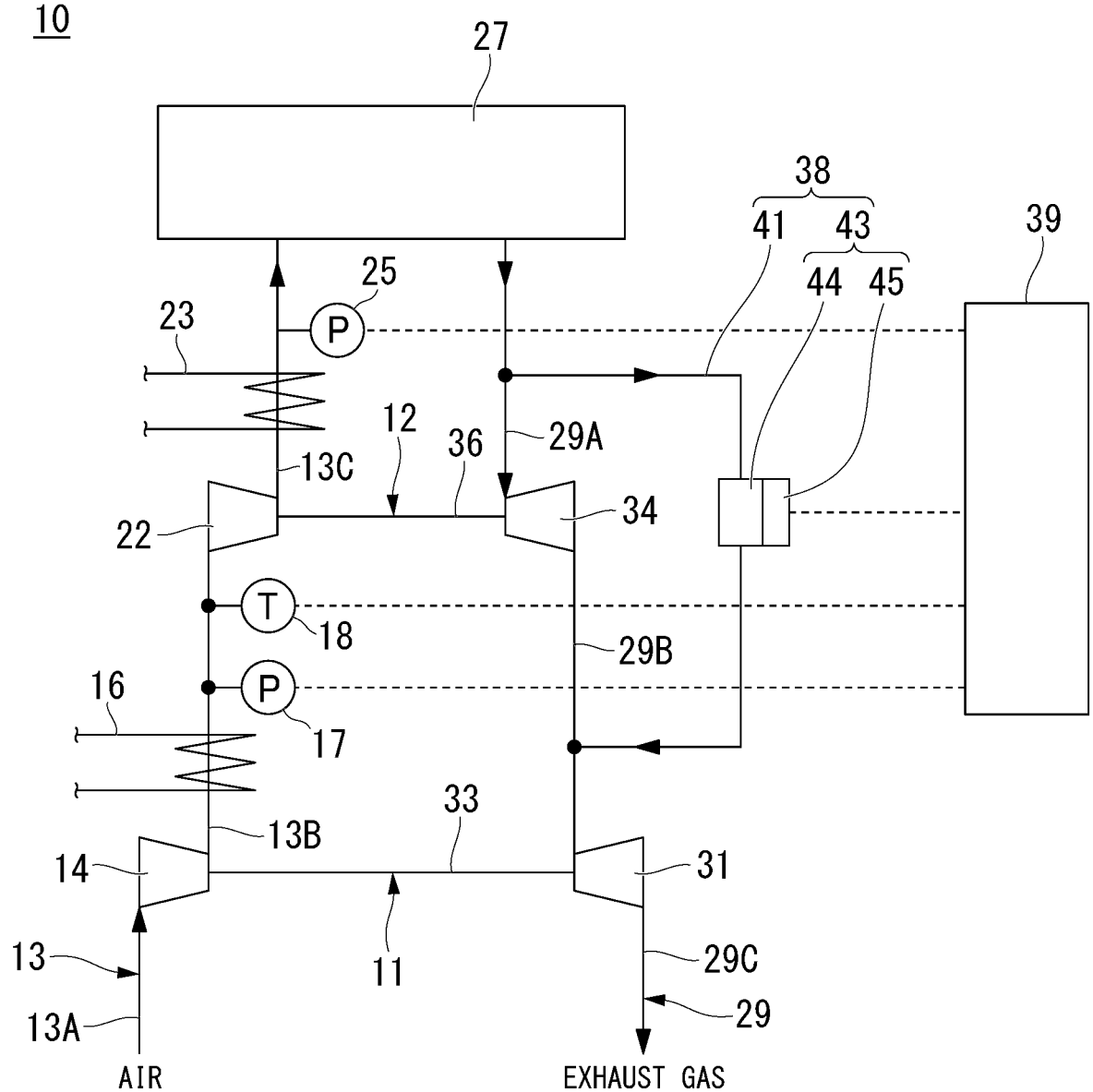
FIG. 1 is a diagram schematically illustrating a schematic configuration of an engine system according to a first embodiment of the present invention.

An engine system 10 according to a first embodiment of the present invention will be described with reference to FIG. 1.

The engine system 10 includes a low-pressure turbocharger 11 and a high-pressure turbocharger 12 (two-stage turbocharger). The engine system 10 includes a supply line 13, a low-pressure compressor 14, a first cooling unit 16, a first pressure detection unit 17, a temperature detection unit 18, a high-pressure compressor 22, a second cooling unit 23, a second pressure detection unit 25, an engine 27, an exhaust line 29, a low-pressure turbine 31, a first rotation shaft 33, a high-pressure turbine 34, a second rotation shaft 36, an exhaust gas flowrate adjustment unit 38, and an engine system control apparatus 39.

The turbocharger 11 includes the low-pressure compressor 14, the first rotation shaft 33, and the low-pressure turbine 31. The turbocharger 12 includes the high-pressure compressor 22, the second rotation shaft 36, and the high-pressure turbine 34.

The supply line 13 includes a first supply line 13A, a second supply line 13B, and a third supply line 13C.

One end of the first supply line 13A is in a state of being capable of sucking air, and the other end is connected to a suction port of the low-pressure compressor 14.

One end of the second supply line 13B is connected to a discharge port of the low-pressure compressor 14 and the other end is connected to a suction port of the high-pressure compressor 22. The second supply line 13B supplies suction air (for example, the air) compressed by the low-pressure compressor 14 to the suction port of the high-pressure compressor 22.

In the first embodiment, as an example, the case where the suction air is air will be described as an example.

One end of the third supply line 13C is connected to a discharge port of the high-pressure compressor 22 and the other end is connected to a suction port of the engine 27. The third supply line 13C supplies the high-pressure air compressed by the high-pressure compressor 22 to the suction port of the engine 27.

The low-pressure compressor 14 is provided on the supply line 13. The low-pressure compressor 14 compresses the air supplied from the first supply line 13A and discharges the result to the second supply line 13B. The low-pressure compressor 14 is connected to one end of the first rotation shaft 33.

The first cooling unit 16 cools the compressed air flowing through the second supply line 13B. The compressed and cooled air is supplied to the suction port of the high-pressure compressor 22.

The first pressure detection unit 17 is provided on the second supply line 13B in a state of being capable of detecting a pressure of the cooled and compressed suction air. The first pressure detection unit 17 is electrically connected to the engine system control apparatus 39. The first pressure detection unit 17 detects a pressure on the inlet side of the high-pressure compressor 22. The first pressure detection unit 17 transmits information on the detected pressure on the inlet side of the high-pressure compressor 22 to the engine system control apparatus 39.

The temperature detection unit 18 is provided in the second supply line 13B in a state of being capable of detecting a temperature of the cooled and compressed air (hereinafter, referred to as "temperature t"). The temperature detection unit 18 is electrically connected to the engine system control apparatus 39. The temperature detection unit 18 detects the temperature t of the air introduced into the high-pressure compressor 22, and transmits information on the detected temperature t of the air to the engine system control apparatus 39.

The high-pressure compressor 22 is provided on the supply line 13 and is disposed between the low-pressure compressor 14 and the engine 27. The high-pressure compressor 22 further compresses the air compressed by the low-pressure compressor 14 and discharges the result to the third supply line 13C.

The second cooling unit 23 cools the compressed air flowing through the third supply line 13C. The compressed and cooled air is supplied to the suction port of the engine 27.

The second pressure detection unit 25 is provided on the third supply line 13C in a state in a state of being capable of detecting the pressure of the compressed and cooled air. The second pressure detection unit 25 is electrically connected to the engine system control apparatus 39. The second pressure detection unit 25 detects a pressure on an outlet side of the high-pressure compressor 22. The second pressure detection unit 25 transmits the information on the detected pressure on the outlet side of the high-pressure compressor 22 to the engine system control apparatus 39.

The engine 27 is driven by the compressed air supplied from the high-pressure compressor 22.

The engine 27 is connected to one end of the exhaust line 29. The engine 27 discharges exhaust gas (exhaust gas) including the air that has passed through the engine 27 to the exhaust line 29.

The exhaust line 29 includes a first exhaust line 29A, a second exhaust line 29B, and a third exhaust line 29C.

One end of the first exhaust line 29A is connected to the engine and the other end is connected to the suction port of the high-pressure turbine 34.

One end of the second exhaust line 29B is connected to the discharge port of the high-pressure turbine 34 and the other end is connected to the suction port of the low-pressure turbine 31. The second exhaust line 29B guides the air that has passed through the high-pressure turbine 34 to the suction port of the low-pressure turbine 31.

One end of the third exhaust line 29C is connected to the discharge port of the low-pressure turbine 31. The third exhaust line 29C guides the exhaust gas that has passed through the low-pressure turbine 31 to the outside of the engine system 10.

The low-pressure turbine 31 is provided on the exhaust line 29. The low-pressure turbine 31 is connected to the other end of the first rotation shaft 33. The low-pressure turbine 31 rotationally drives the low-pressure compressor 14 by rotating the first rotation shaft 33 using the exhaust gas. In the present embodiment, the pressure on the inlet side of the low-pressure turbine 31 is assumed to be a pressure P7, and the pressure on the outlet side of the low-pressure turbine 31 is assumed to be a pressure P8.

The high-pressure turbine 34 is provided on the exhaust line 29. The high-pressure turbine 34 is disposed between the engine 27 and the low-pressure turbine 31. The high-pressure turbine 34 rotationally drives the high-pressure compressor 22 by rotating the second rotation shaft 36 using the exhaust gas. In the present embodiment, a pressure on the inlet side of the high-pressure turbine 34 is assumed to be a pressure P5, and a pressure on the outlet side of the high-pressure turbine 34 is assumed to be a pressure P6.

The exhaust gas flowrate adjustment unit 38 includes a bypass line 41 and a valve 43. The bypass line 41 is branched from the first exhaust line 29A and connected to the second exhaust line 29B. Both ends of the bypass line 41 are connected to the exhaust line 29. The bypass line 41 is a line for bypassing the high-pressure turbine 34.

The valve 43 includes a valve body 44 provided on the bypass line 41 and an actuator 45 for an operation of opening and closing the valve body 44. The actuator 45 is electrically connected to the engine system control apparatus 39. The actuator 45 adjusts an opening degree of the valve body 44 based on an opening degree signal (a signal relating to an amount of displacement of the opening degree of the valve body 44) transmitted from the engine system control apparatus 39.

The opening degree signal includes a signal for maximizing the opening degree of the valve body 44 and a signal for closing the valve body 44.

For example, a solenoid valve can be used as the valve 43.

Figure 2:
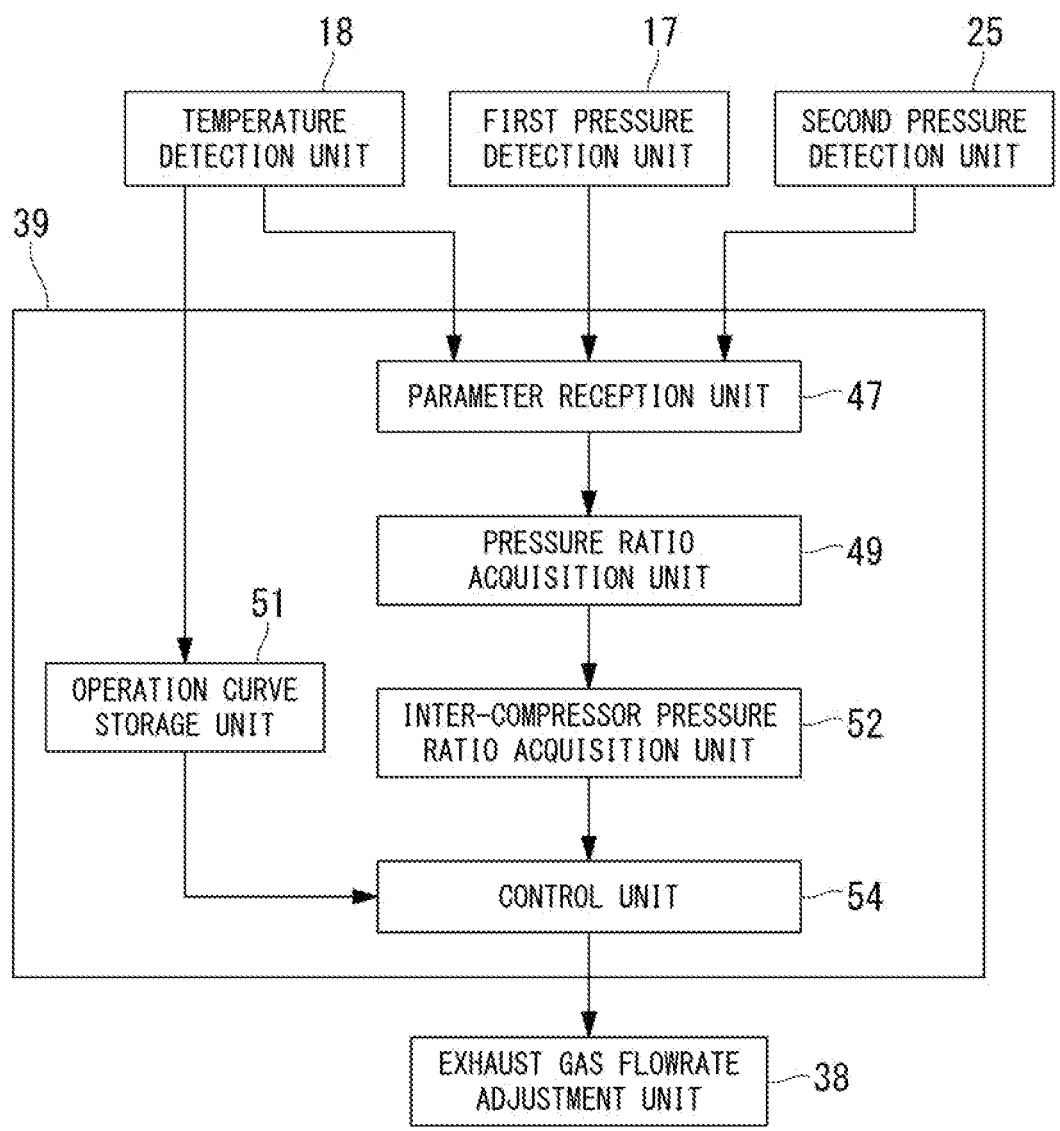
FIG. 2 is a functional block diagram of the engine system control apparatus illustrated in FIG. 1.

A functional block diagram of the engine system control apparatus 39 will be described with reference to FIG. 1 and FIG. 2. In FIG. 2, the same reference signs will be given to the same configuration elements as those of the structural body in FIG. 1.

The engine system control apparatus 39 includes a parameter reception unit 47, a pressure ratio acquisition unit 49, an operation curve storage unit 51, an inter-compressor pressure ratio acquisition unit 52, and a control unit 54.

The parameter reception unit 47 is electrically connected to the temperature detection unit 18, the first pressure detection unit 17, the second pressure detection unit 25, and the pressure ratio acquisition unit 49.

The parameter reception unit 47 receives parameters necessary for acquiring the pressure ratio of the low-pressure compressor 14 (=(outlet side pressure P2 of the low-pressure compressor 14)/(inlet side pressure P1 of the low-pressure compressor 14)) and the pressure ratio of the high-pressure compressor (=(outlet side pressure P4 of the high-pressure compressor 22)/(inlet side pressure P3 of the high-pressure compressor 22)).

Specifically, the parameter reception unit 47 receives the temperature t of the air detected by the temperature detection unit 18, the inlet side pressure P3 of the high-pressure compressor 22 detected by the first pressure detection unit 17, and the outlet side pressure P4 of the high-pressure compressor 22 detected by the second pressure detection unit 25 as the parameters.

In the first embodiment, assuming that the outlet side pressure P2 of the low-pressure compressor 14 and the inlet side pressure P3 of the high-pressure compressor 22 are equal to each other, the description will be made as follows with an example using atmospheric pressure (=atmospheric pressure Pa) as the inlet side pressure P1 of the low-pressure compressor 14.

The pressure ratio acquisition unit 49 is electrically connected to the inter-compressor pressure ratio acquisition unit 52. The pressure ratio acquisition unit 49 acquires the pressure ratio of the low-pressure compressor 14 and the pressure ratio of the high-pressure compressor 22 described above using the atmospheric pressure that is the inlet side pressure of the low-pressure compressor 14, and based on the parameters received by the parameter reception unit 47.

The operation curve storage unit 51 is electrically connected to the temperature detection unit 18 and the control unit 54.

A plurality of operation curves (refer to FIG. 3) illustrating a relationship between the inter-compressor pressure ratio (=(pressure ratio of the high-pressure compressor 22)/(pressure ratio of the low-pressure compressor 14)) and an operation efficiency of the engine system 10 shown are stored in the operation curve storage unit 51.

Here, an example of a graph of a plurality of operation curves illustrated in FIG. 3 will be described.

Figure 3:
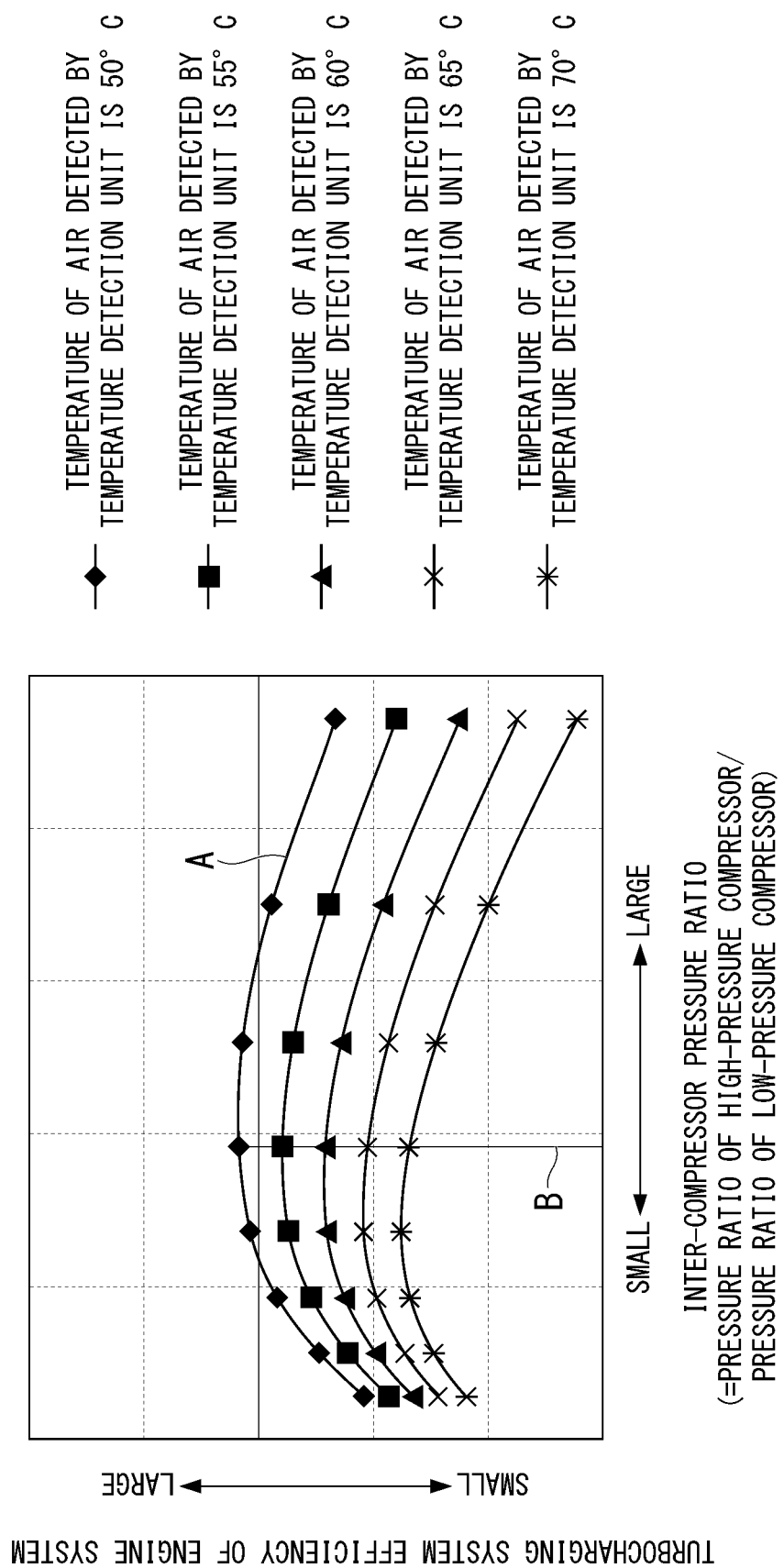
FIG. 3 is a graph illustrating a relationship between an inter-compressor pressure ratio and a turbocharging system efficiency of the engine system.

In FIG. 3, the horizontal axis represents the inter-compressor pressure ratio, and the vertical axis represents a turbocharging system efficiency ηtc (system efficiency of the turbocharging system) of the engine system 10.

The turbocharging system efficiency ηtc of the engine system 10 can be obtained based on the following equation (1).

$$\eta_{tc} = \frac{G_a \dfrac{K_a}{K_a - 1} RT_a \left(\pi_c^{\frac{K_a-1}{K_a}} - 1\right)}{G_e \dfrac{K_e}{K_e - 1} RT_e \left\{1 - \left(\dfrac{1}{\pi_t}\right)^{\frac{K_e-1}{K_e}}\right\}} \quad (1)$$

In Equation (1), $G_a$ indicates a flowrate of the air flowing through the second supply line 13B (kg/s), $G_e$ indicates a flowrate of the air flowing through the third supply line 13C (kg/s), $K_a$ indicates a ratio of specific heat of the air (=1.40), and $K_e$ indicates a ratio of specific heat (=1.35) of the exhaust gas (exhaust gas), respectively.

In addition, in Equation (1) described above, R indicates a gas constant for the air (=287 J/kg·K), $K_a$ indicates the temperature t of the air (=298 K) at the inlet side of the low-pressure compressor 14, and Te indicates the temperature (K) of the air at the inlet side of the high-pressure turbine 34, respectively.

In addition, when the outlet side pressure of the high-pressure compressor 22 is P4 and the inlet side pressure of the high-pressure compressor 22 is P3, the pressure ratio πc indicated in the above Equation (1) is P2/Pa, and the pressure ratio πt is P4/P3. Pa is the atmospheric pressure Pa described above.

In FIG. 3, as an example, the operation curves (total of five operation curves) when the temperature t of the air (in other words, the temperature detected by the temperature detection unit 18) at the inlet side of the high-pressure compressor 22 is 50° C., 55° C., 60° C., 65° C., and 70° C., are illustrated.

The operation curve storage unit 51 selects one operation curve based on the temperature of the air detected by the temperature detection unit 18. For example, when the temperature of the air detected by the temperature detection unit 18 is 50° C., an operation curve A is selected from a plurality of operation curves.

A plurality of operation curves are upward convex curves. In a case of operation curve A, the inter-compressor pressure ratio when the turbocharging system efficiency of the engine system 10 becomes the highest is B, as illustrated in FIG. 3.

B is a predetermined pressure ratio (hereinafter referred to as a "predetermined pressure ratio B") that optimizes the operation efficiency of the engine system 10.

As a difference between the inter-compressor pressure ratio and the predetermined pressure ratio B of the engine system 10 during the operation increases, the operation efficiency of the engine system 10 decreases. On the other hand, as the difference between the inter-compressor pressure ratio and the predetermined pressure ratio B of the engine system 10 during the operation decreases, the turbocharging system operation efficiency of the engine system 10 increases. Therefore, the operation efficiency of the engine system 10 can be increased.

The inter-compressor pressure ratio acquisition unit 52 acquires the inter-compressor pressure ratio obtained by dividing the pressure ratio of the high-pressure compressor by the pressure ratio of the low-pressure compressor.

The control unit 54 is electrically connected to the exhaust gas flowrate adjustment unit 38. The control unit 54 controls the exhaust gas flowrate adjustment unit 38 such that the inter-compressor pressure ratio becomes the predetermined pressure ratio (in the case of FIG. 3, the predetermined pressure ratio B) for optimizing the operation efficiency of the engine system 10, based on the inter-compressor pressure ratio acquired by the inter-compressor pressure ratio acquisition unit 52 and the operation curve (the operation curve A illustrated in FIG. 3 when the temperature is 50° C.) corresponding to the temperature of the air detected by the temperature detection unit 18.

The control unit 54 acquires a control amount of the exhaust gas flowrate adjustment unit 38, such that the inter-compressor pressure ratio of the engine system 10 during operation becomes equal to the predetermined pressure ratio. Specifically, the control unit 54 acquires the amount of displacement of the valve body 44 to be transmitted to the actuator 45 as the control amount.

The control unit 54 controls the opening degree of the valve body 44 by transmitting a signal relating to the displacement of the opening degree to the actuator 45.

Figure 4:
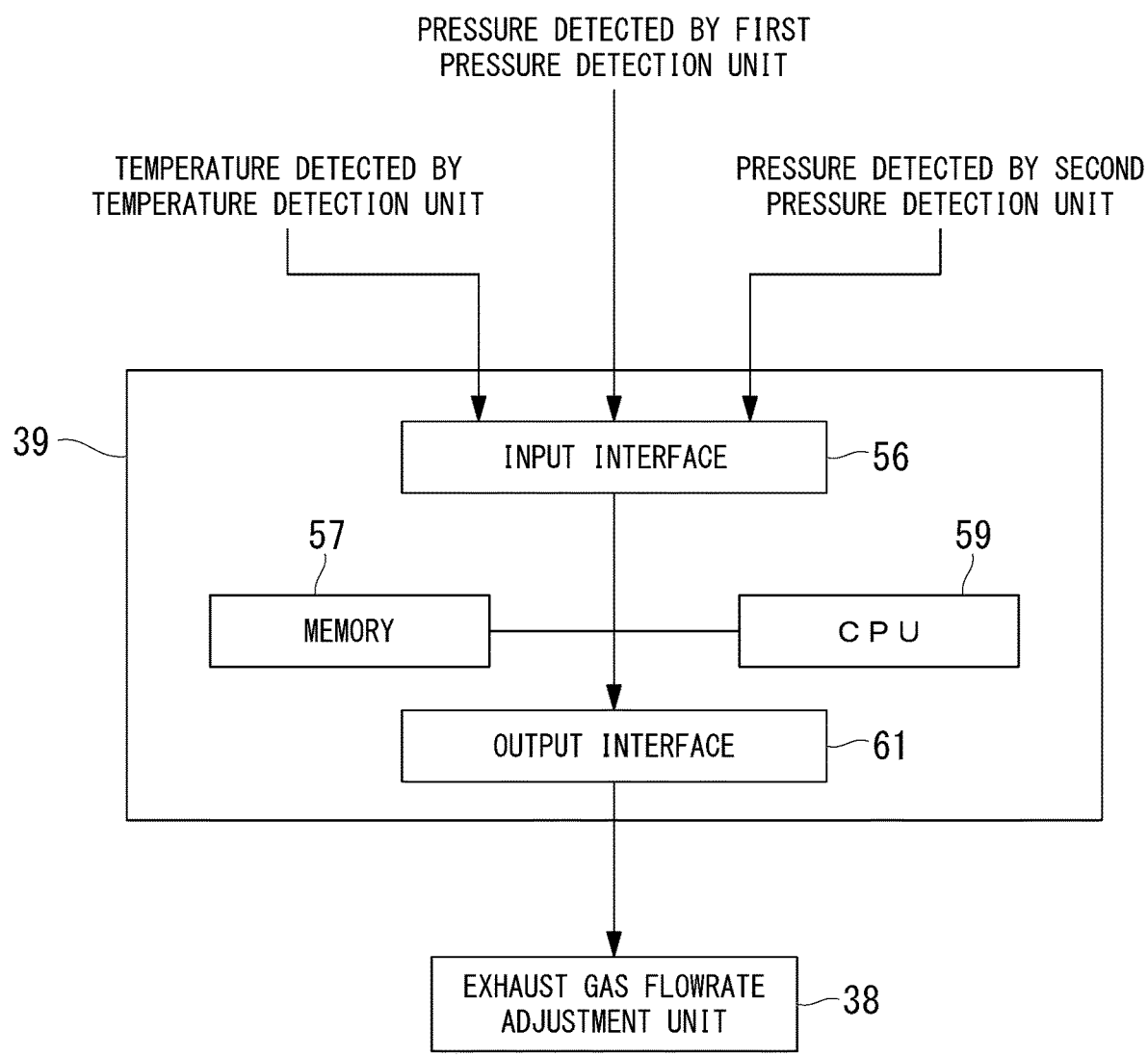
FIG. 4 is a diagram schematically illustrating a hardware configuration of the engine system control apparatus illustrated in FIG. 1.

A hardware configuration of the engine system control apparatus will be described with reference to FIG. 1, FIG. 2, and FIG. 4.

The engine system control apparatus 39 includes an input interface 56, a memory 57, a CPU 59, and an output interface 61.

The input interface 56 is a portion corresponding to the parameter reception unit 47 illustrated in FIG. 2. The memory 57 includes the operation curve storage unit 51 illustrated in FIG. 2, and stores a program for driving the engine system 10.

The CPU 59 is electrically connected to the input interface 56, the memory 57, and the output interface 61.

The CPU 59 is a portion corresponding to the pressure ratio acquisition unit 49 and the inter-compressor pressure ratio acquisition unit 52 illustrated in FIG. 2 and a part of the control unit 54 (a part for acquiring the amount of displacement of the valve body 44).

The output interface 61 corresponds to the remaining portion of the control unit 54 (the portion that transmits the acquired amount of displacement of the opening degree of the valve body 44 to the actuator 45 of the exhaust gas flowrate adjustment unit).

Next, the processing performed by the engine system control apparatus 39 in the first embodiment will be described with reference to FIG. 1 and FIG. 5.

Figure 5:
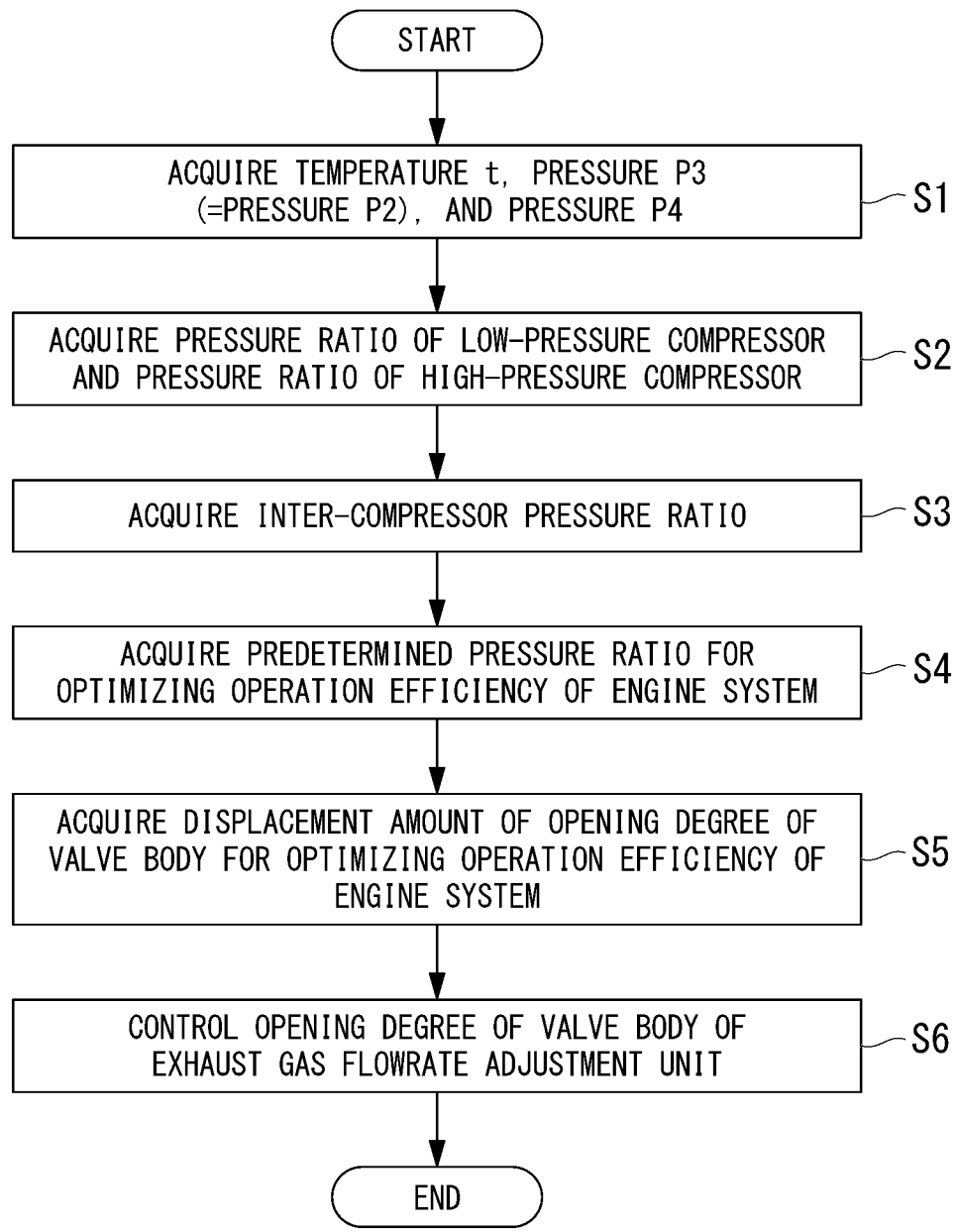
FIG. 5 is a flowchart explaining processing performed by the engine system control apparatus in the first embodiment.

When the processing illustrated in FIG. 5 is started, in S1, the temperature t, the pressure P3 (=pressure P2), and the pressure P4 are respectively acquired by the temperature detection unit 18, the first pressure detection unit 17, and the second pressure detection unit 25. In a case of the flowchart in FIG. 5, since the inlet side pressure P1 of the low-pressure compressor 14 is atmospheric pressure Pa (=1 bar), the pressure detection unit does not acquire the pressure P1.

The information on the acquired temperature t, pressure the P3 (=pressure P2), the pressure P4, and the pressure P1 (=1 bar) are transmitted to the parameter reception unit 47.

Subsequently, in S2, the pressure ratio acquisition unit 49 acquires the pressure ratio of the low-pressure compressor 14 and the pressure ratio of the high-pressure compressor 22 using the method described above based on the pressure P1 (=1 bar), the pressure P3 (=pressure P2), and the pressure P4.

Next, in step S3, the inter-compressor pressure ratio acquisition unit 52 acquires the inter-compressor pressure ratio using the method described above.

Next, in step S4, the control unit 54 acquires the predetermined pressure ratio for optimizing the operation efficiency of the engine system 10 based on the operation curve (the operation curve stored in the operation curve storage unit 51) corresponding to the temperature t.

Next, in step S5, the control unit 54 acquires the amount of displacement of the opening degree of the valve body 44, which makes the inter-compressor pressure ratio become the predetermined pressure ratio.

Thereafter, in S6, the control unit 54 controls the opening degree of the valve body of the exhaust gas flowrate adjustment unit based on the amount of displacement of the opening degree of the valve body 44 acquired in S5. Then, the processing illustrated in FIG. 5 ends.

The processing illustrated in FIG. 5 may be performed repeatedly after a predetermined time, or may be performed continuously.

According to the engine system control apparatus 39 in the first embodiment, the apparatus includes the parameter reception unit 47, the pressure ratio acquisition unit 49, the inter-compressor pressure ratio acquisition unit 52, the operation curve storage unit 51 and the control unit 54 described above. Therefore, it is possible to control the exhaust gas flowrate adjustment unit 38 such that the inter-compressor pressure ratio becomes a predetermined pressure ratio for optimizing the operation efficiency of the engine system.

As a result, it is possible to improve the fuel efficiency of the engine system 10 provided with the two-stage turbocharger (specifically, the turbochargers 11 and 12).

In the first embodiment, as an example, the description is made with an example of a case where the inlet side temperature of the high-pressure compressor 22 is detected using the temperature detection unit 18 and the operation curve corresponding to the inlet side temperature of the high-pressure compressor 22 is used. However, the outlet side temperature of the high-pressure compressor 22 may be detected using the temperature detection unit 18, and the operation curve corresponding to the outlet side temperature of the high-pressure compressor 22 may be used.

Alternatively, the inlet side temperature of the low-pressure compressor 14 may be detected using the temperature detection unit 18, and the operation curve corresponding to the inlet side temperature of the low-pressure compressor 14 may be used.

That is, the temperature detection unit 18 may measure the temperature of the supply line 13 at any predetermined positions (temperature at one point).

Figure 6:
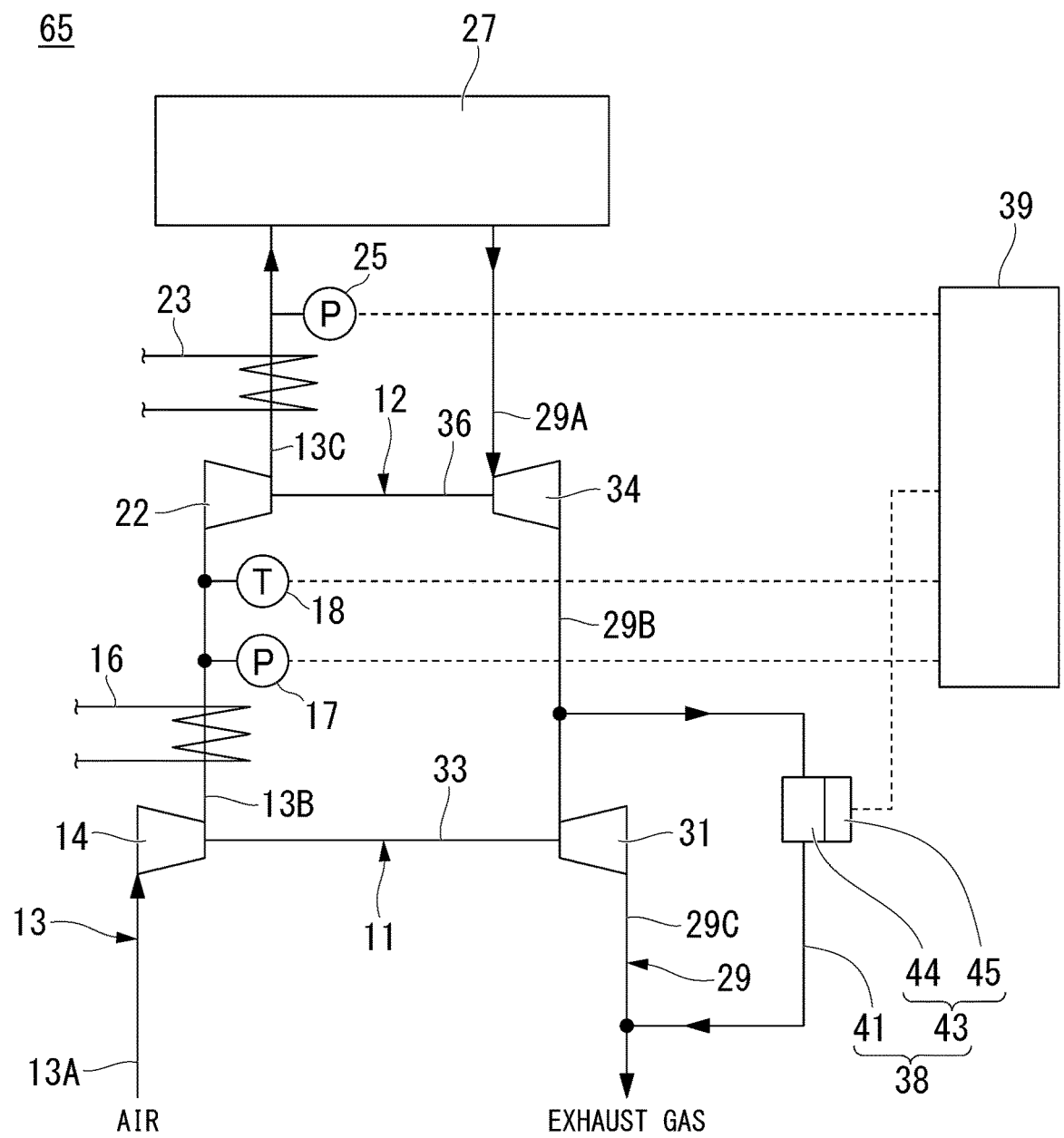
FIG. 6 is a diagram schematically illustrating a schematic configuration of an engine system according to a first modification example of the first embodiment.

Next, an engine system 65 in a first modification example of the first embodiment will be described with reference to FIG. 6.

The engine system 65 is configured in the same manner as the engine system 10 in the first embodiment except that the connection position and the branch position of the bypass line 41 are different from those in the engine system 10.

The bypass line 41 is branched from the second exhaust line 29B and is connected to the third exhaust line 29C. The bypass line 41 is a line for bypassing the low-pressure turbine 31.

The engine system 65 in the first modification example of the first embodiment configured in this manner can obtain the same effect as that of the engine system 10 in the first embodiment described above.

Figure 7:
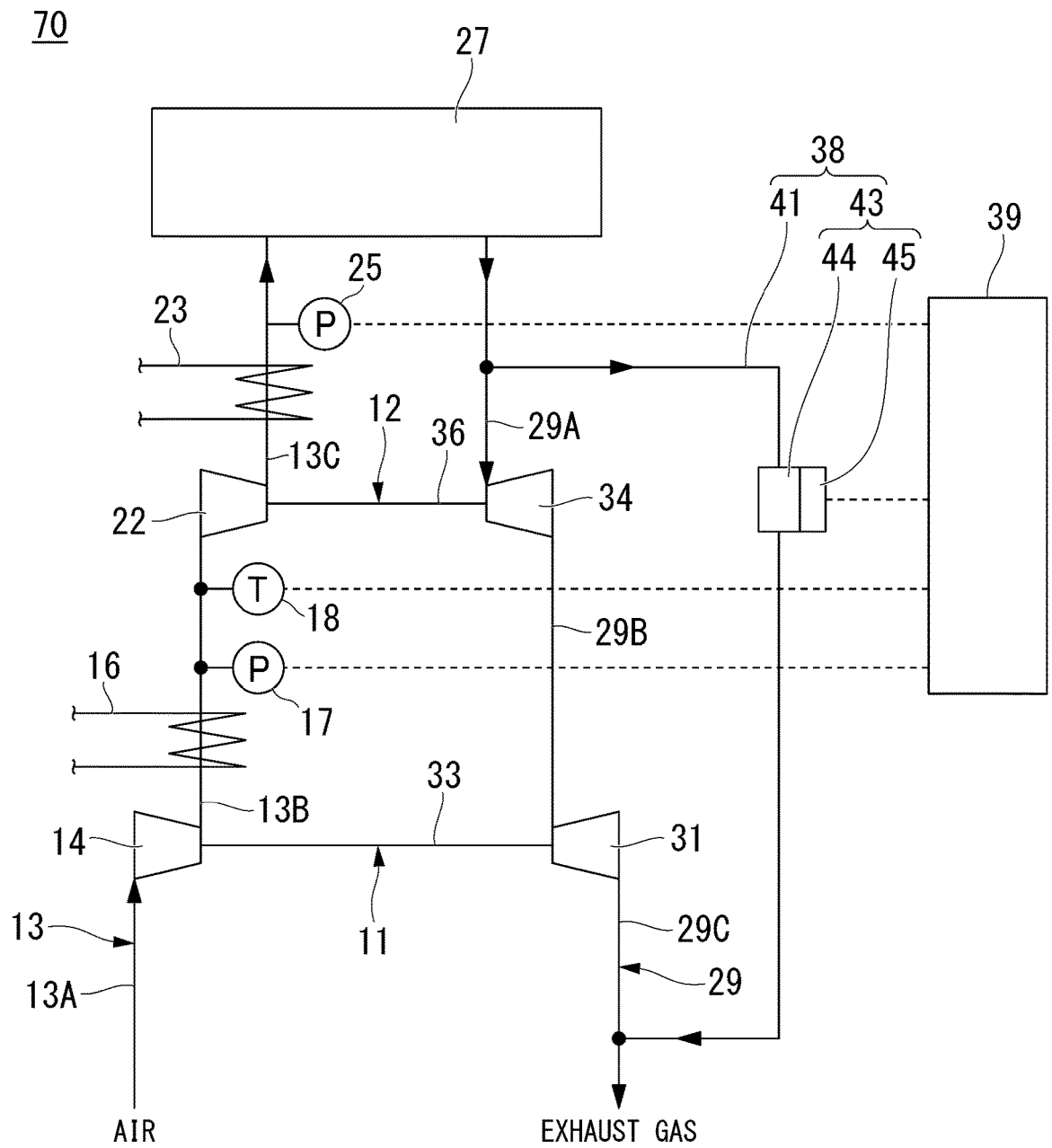
FIG. 7 is a diagram schematically illustrating a schematic configuration of an engine system according to a second modification example of the first embodiment.

An engine system 70 in a second modification example of the first embodiment will be described with reference to FIG. 7.

The engine system 70 is configured in the same manner as the engine system 10 in the first embodiment except that the connection position of the bypass line 41 is different from that in the engine system 10.

The bypass line 41 is connected to the third exhaust line 29C. The bypass line 41 is the line for bypassing the low-pressure turbine 31 and the high-pressure turbine 34.

The engine system 70 in the second modification example of the first embodiment configured in this manner can obtain the same effect as that of the engine system 10 in the first embodiment described above.

Second Embodiment

Figure 8:
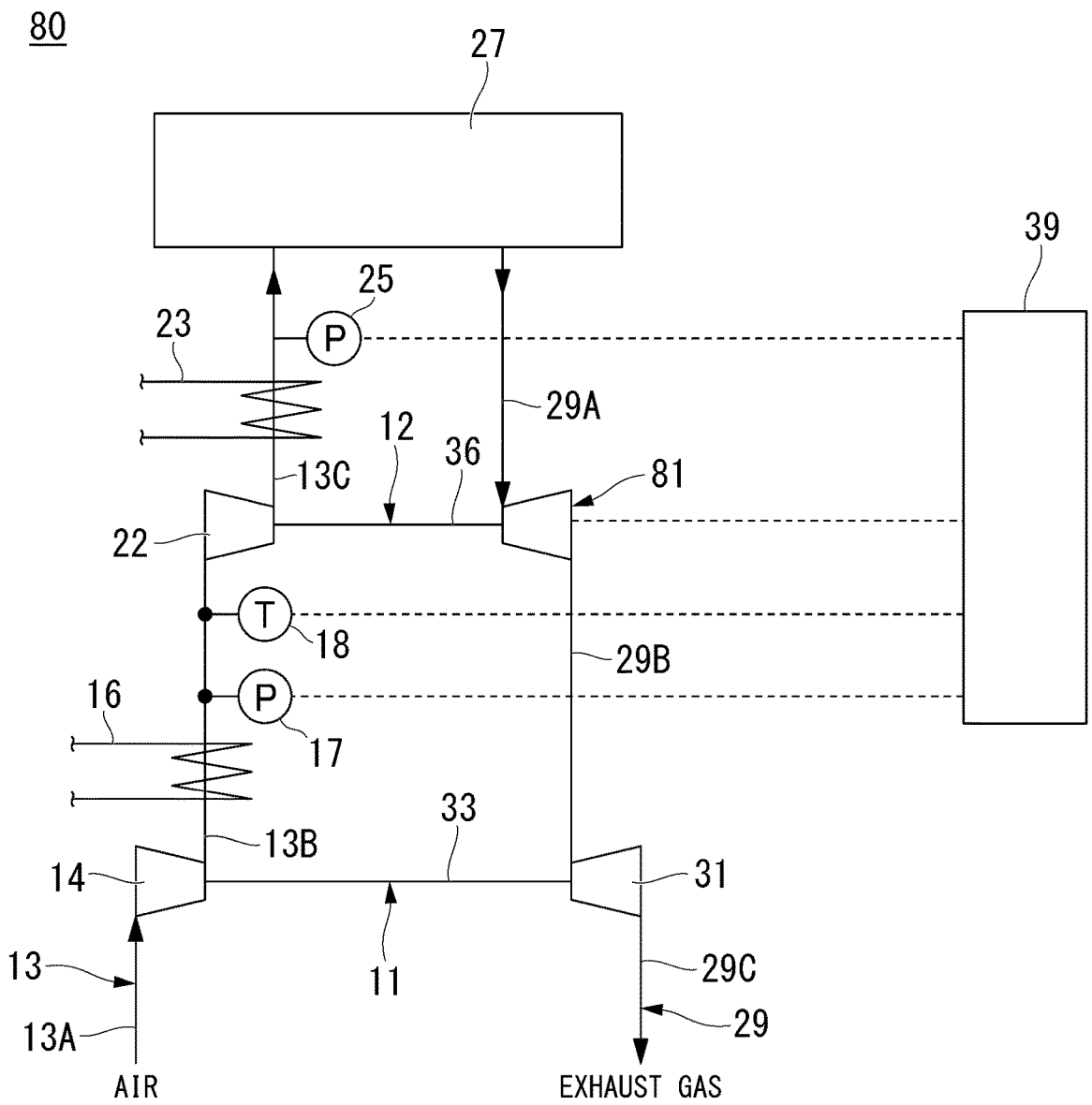
FIG. 8 is a diagram schematically illustrating a schematic configuration of an engine system according to a second embodiment of the present invention.

An engine system 80 according to a second embodiment of the present invention will be described with reference to FIG. 8. In FIG. 8, the same reference signs will be given to the same configuration elements as those of the engine system 10 in the first embodiment described above.

The engine system 80 is configured in the same manner as the engine system 10 in the first embodiment except that the engine system 80 includes a high-pressure turbine 81 instead of the high-pressure turbine 34 and the exhaust gas flowrate adjustment unit 38.

Figure 9:
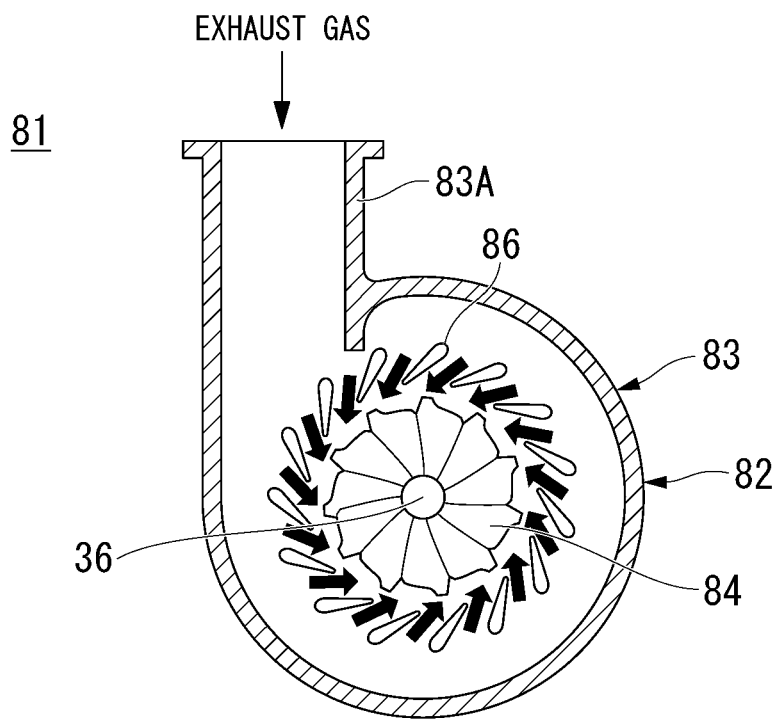
FIG. 9 is a diagram explaining an internal configuration of the high-pressure turbine illustrated in FIG. 8 and schematically illustrating a state in which variable nozzles are opened.
Figure 10:
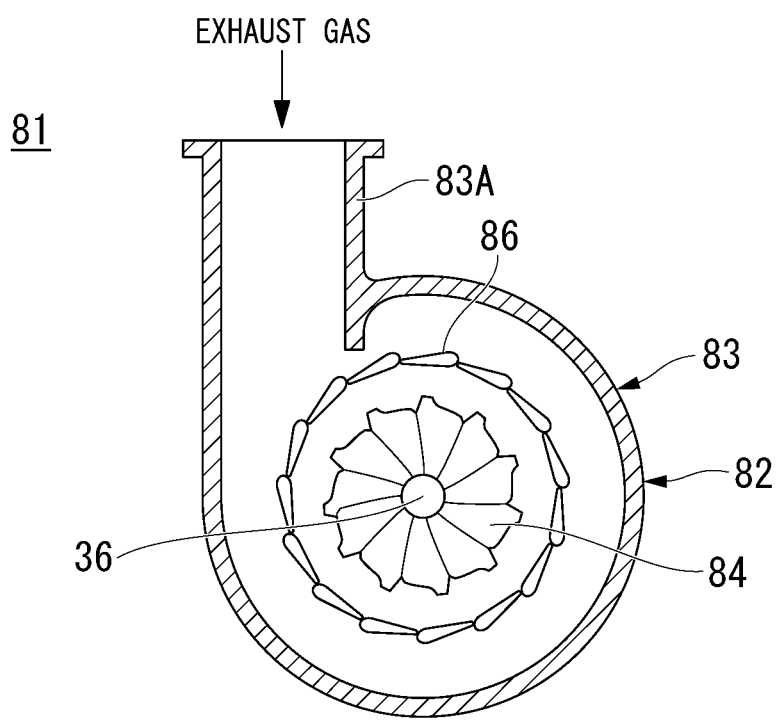
FIG. 10 is a diagram explaining the internal configuration of the high-pressure turbine illustrated in FIG. 8 and schematically illustrating a state in which the variable nozzles are closed.

Here, the high-pressure turbine 81 will be described with reference to FIG. 9 and FIG. 10. In FIG. 9 and FIG. 10, the same reference signs will be given to the same configuration elements as those of the structural body illustrated in FIG. 8. In FIG. 9, the moving directions of the exhaust gas are illustrated in black arrows.

The high-pressure turbine 81 includes a turbine main body 82 that includes a housing 83 and a plurality of moving blades 84, and a plurality of variable nozzles 86 functioning as an exhaust gas flowrate adjustment unit.

The housing 83 includes an introduction port 83A that introduces the exhaust gas and an outlet port (not illustrated) for exhausting the exhaust gas. The plurality of moving blades 84 are provided around the second rotation shaft 36.

The plurality of variable nozzles 86 are provided inside the housing 83. The plurality of variable nozzles 86 are disposed outside the plurality of moving blades 84.

The plurality of variable nozzles 86 are disposed to surround the circumference of the plurality of moving blades 84 in a state of being spaced apart from the plurality of moving blades 84. The plurality of variable nozzles 86 are electrically connected to the engine system control apparatus 39. The plurality of variable nozzles 86 are configured in such a manner that the opening degree can be adjusted by the engine system control apparatus 39.

As illustrated in FIG. 9, in a state where it makes the opening degrees of the plurality of variable nozzles 86 increase, a large amount of exhaust gas is supplied to the plurality of moving blades 84. On the other hand, as illustrated in FIG. 10, in a state where it makes the opening degrees of the plurality of variable nozzles 86 decrease, the exhaust gas supplied to the plurality of moving blades 84 becomes smaller.

According to the engine system 80 in the second embodiment configured in this manner, since the bypass line 41 and the valve 43 described in the first embodiment are not necessary, it is possible to simplify the configuration of the engine system 80.

In addition, the engine system 80 in the second embodiment can obtain the same effect as that of the engine system 10 in the first embodiment described above.

In the second embodiment, as an example, the description is made with an example of a case where the high-pressure turbine 81 among the low-pressure turbine and the high-pressure turbine includes a plurality of variable nozzles 86. However, for example, the low-pressure turbine 31 may be a turbine that includes the plurality of variable nozzles 86.

Alternatively, both the low-pressure turbine and the high-pressure turbine may be turbines that include the plurality of variable nozzles 86. In these cases, the same effect as that of the engine system 80 in the second embodiment can be obtained.

In addition, in the case of the second embodiment, the processing is performed by the same procedure as that in the flowchart illustrated in FIG. 5 in the first embodiment.

Third Embodiment

Figure 11:
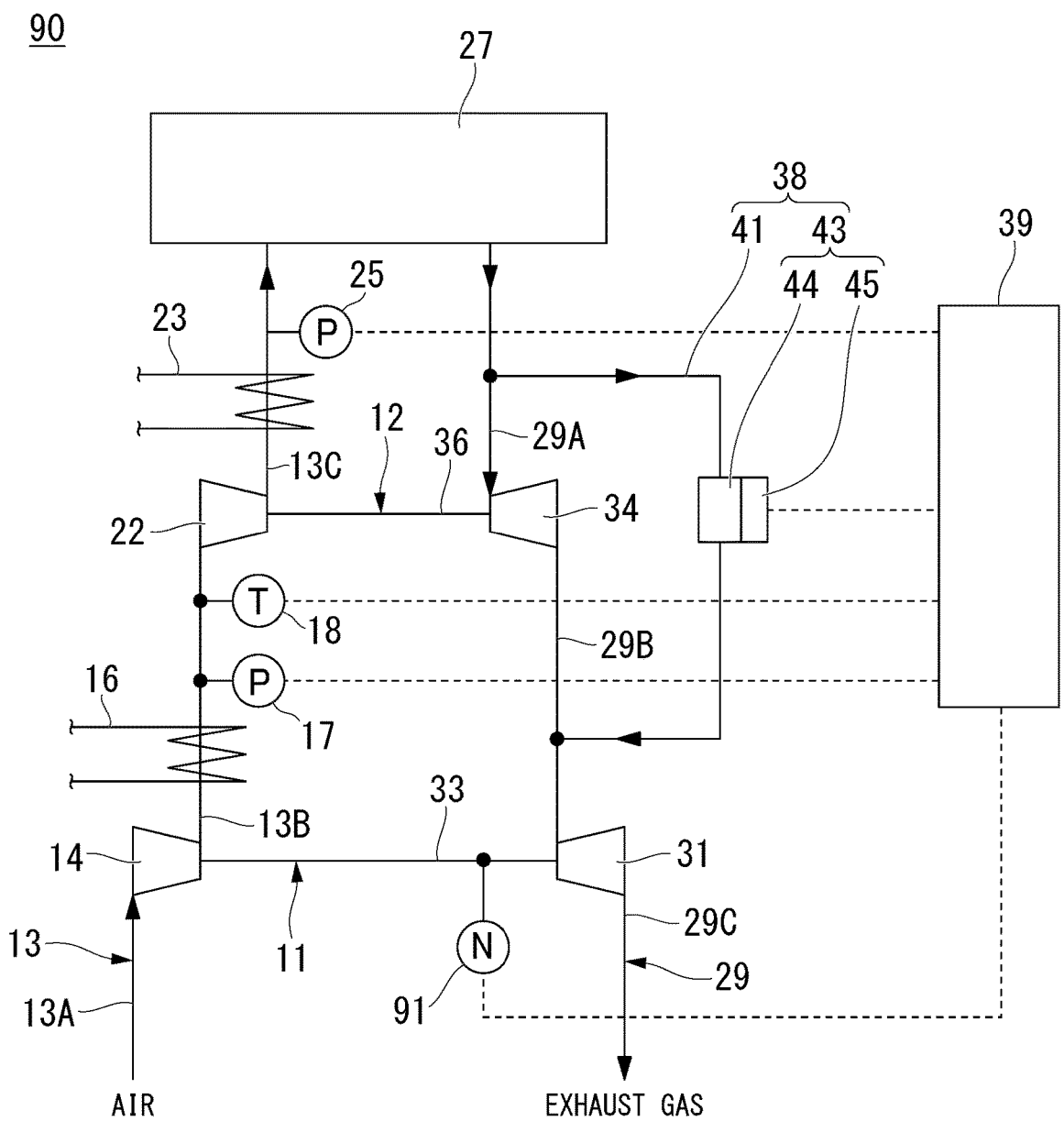
FIG. 11 is a diagram schematically illustrating a schematic configuration of an engine system according to a third embodiment of the present invention.
Figure 12:
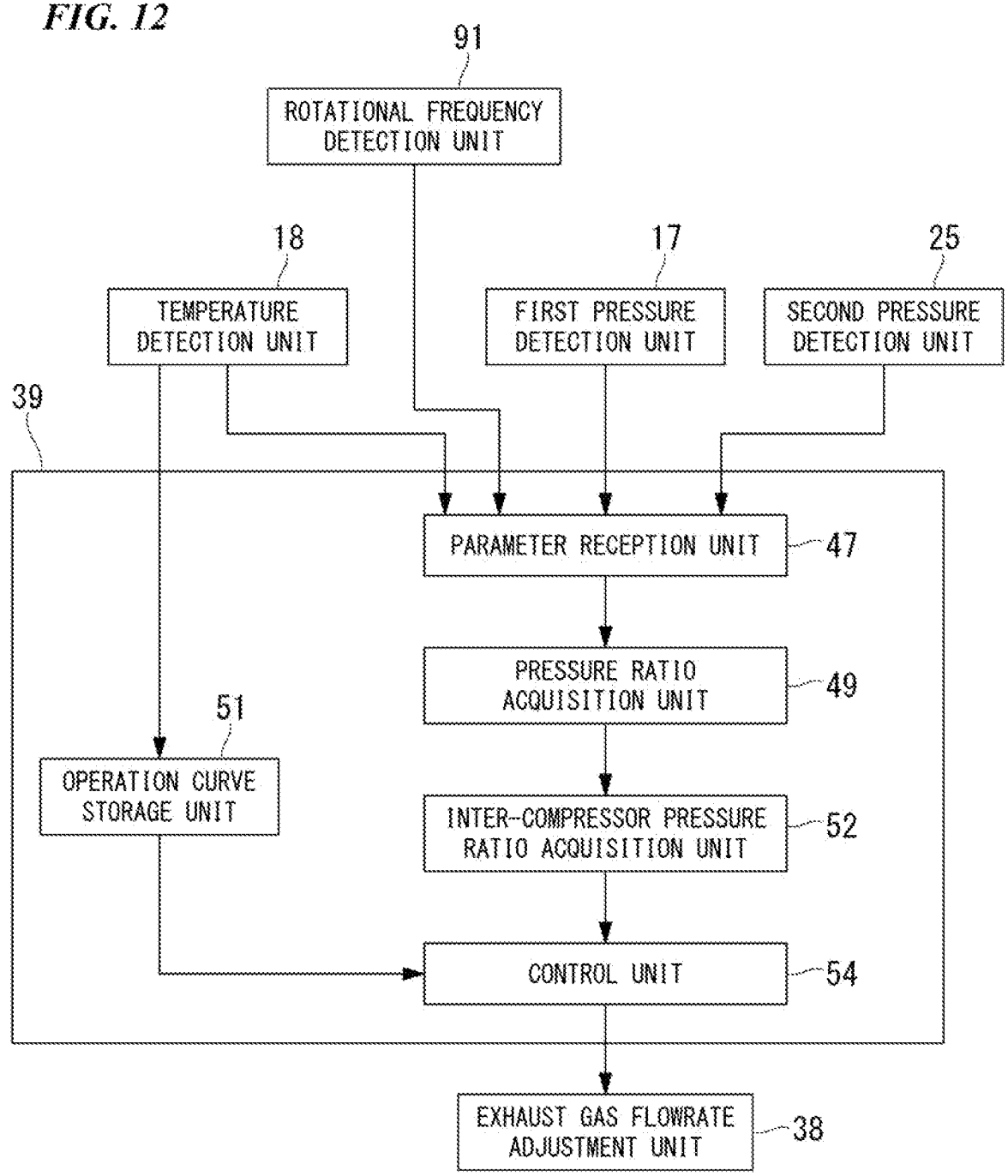
FIG. 12 is a functional block diagram of an engine system control apparatus illustrated in FIG. 11.

The engine system 90 in a third embodiment of the present invention will be described with reference to FIG. 11 and FIG. 12. In FIG. 11, the same reference signs will be given to the same configuration elements as those of the structural body illustrated in FIG. 1. In FIG. 12, the same reference signs will be given to the same configuration elements as those of the structural body illustrated in FIG. 11.

An engine system 90 is configured the same as the engine system 10 in the first embodiment except that the engine system 90 includes a rotational frequency detection unit 91 and processing performed by the pressure ratio acquisition unit 49 is different from that in the first embodiment.

The rotational frequency detection unit 91 is provided at a position where the rotational frequency (hereinafter referred to as "the rotational frequency N") of the first rotation shaft 33 can be detected. The rotational frequency detection unit 91 is electrically connected to the parameter reception unit 47. The rotational frequency detection unit 91 transmits information on the rotational frequency N of the first rotation shaft 33 to the parameter reception unit 47.

The pressure ratio acquisition unit 49 estimates the inlet side pressure P1 of the low-pressure compressor 14 using Equations (2) and (3) described below based on the rotational frequency N received by the parameter reception unit 47, the temperature t, and the pressure P3.

$$Q = f(P3/P1, N) \quad (2)$$

$$P1 = Pa \cdot \Delta P \quad (3)$$

In Equation (2) described above, Q indicates the flowrate of the air, and in Equation (3), Pa indicates the atmospheric pressure (1 bar) and ΔP indicates the pressure loss.

Then, the pressure ratio acquisition unit 49 acquires the pressure ratio of the low-pressure compressor 14 based on the estimated inlet side pressure P1 of the low-pressure compressor 14 and the inlet side pressure P3 of the high-pressure compressor 22.

Figure 13:
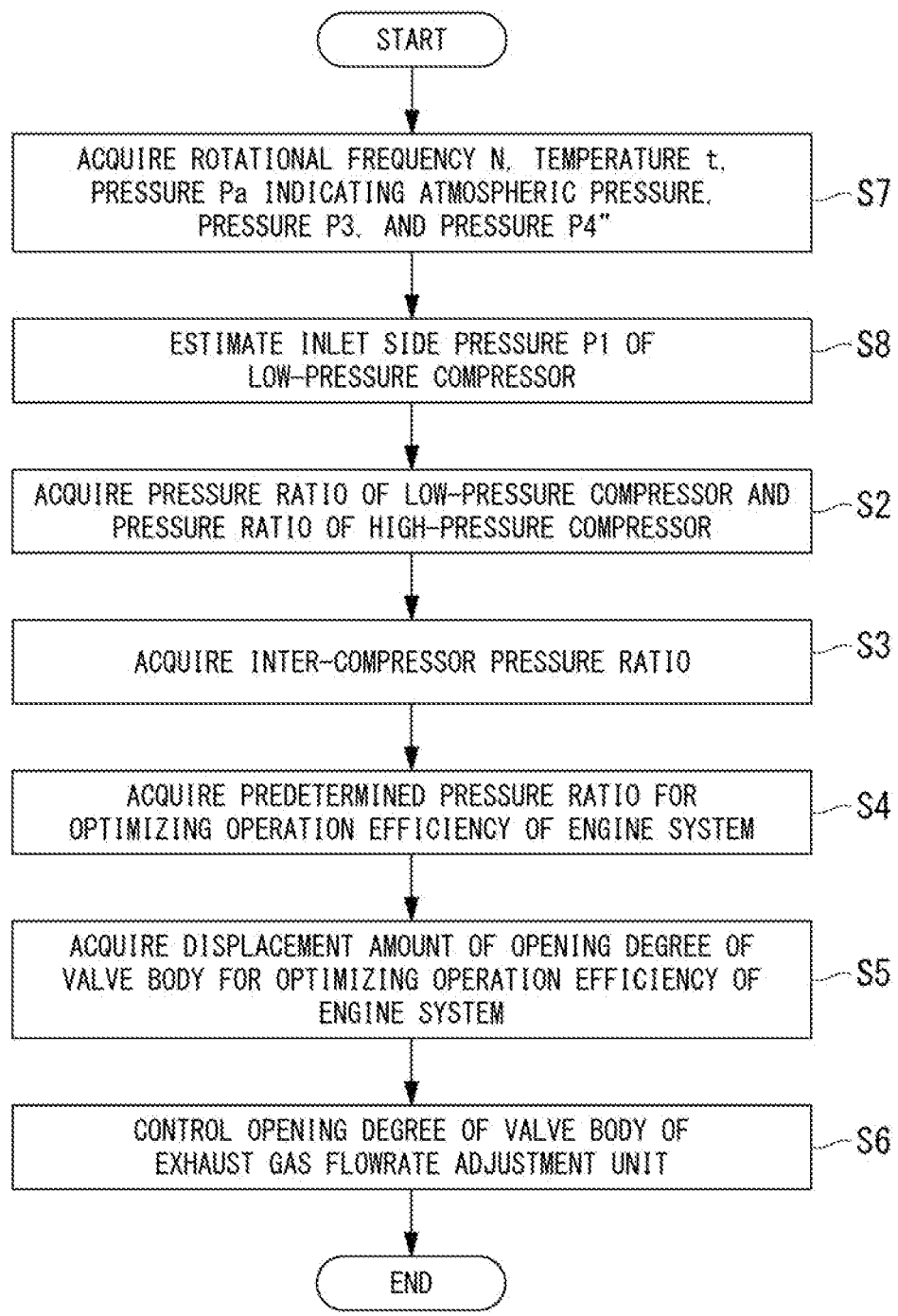
FIG. 13 is a flowchart explaining processing performed by the engine system control apparatus in the third embodiment.

Next, the processing performed by the engine system control apparatus 39 in the third embodiment of the present invention will be described with reference to FIG. 11 to FIG. 13. In FIG. 13, the same reference signs will be given to the same STEPs (S) in the flowchart in FIG. 5.

When the processing in FIG. 13 starts, in S7, the rotational frequency N, the temperature t, the pressure P3, and the pressure P4 are acquired by the rotational frequency detection unit 91, the temperature detection unit 18, the first pressure detection unit 17, and the second pressure detection unit 25, respectively. The information on the acquired rotational frequency N, the temperature t, the pressure Pa, the pressure P3, and the pressure P4 is sent to the parameter reception unit 47.

Next, in S8, the pressure ratio acquisition unit 49 estimates the inlet side pressure P1 of the low-pressure compressor 14 using the above-described method.

Subsequently, in S2, the pressure ratio acquisition unit 49 acquires the pressure ratio of the low-pressure compressor 14 and the pressure ratio of the high-pressure compressor 22 using the pressure P3 (=the pressure P2), the pressure P4, and the pressure P1.

Thereafter, the processing S3 to S6 illustrated in FIG. 5 in the first embodiment are sequentially performed. Then, the processing illustrated in FIG. 13 ends.

According to the engine system 90 in the third embodiment, the rotational frequency detection unit 91 is provided and the inlet side pressure P1 of the low-pressure compressor 14 is estimated based on the rotational frequency N of the first rotation shaft 33 detected by the rotational frequency detection unit 91, the temperature t, the pressure P3, and the pressure Pa. Therefore, it is possible to improve the accuracy of the pressure ratio of the low-pressure compressor 14 compared to the case where the pressure P1 is set to 1 bar (the atmospheric pressure).

As a result, since the accuracy of the inter-compressor pressure ratio can be increased, it is possible to further improve the fuel efficiency of the engine system 90 provided with the two-stage turbochargers 11 and 12.

In addition, it is conceivable to measure the flowrate Q of the air using a flowmeter. However, it is difficult to measure the flowrate in both the low-load state and the high-load state using a single flowmeter. For this reason, when measuring the flowrate Q of the air, since a plurality of flowmeters are required, the cost of the engine system 90 increases.

Accordingly, it is possible to estimate the pressure P1 with a simple configuration by providing a single rotational frequency detection unit 91 instead of plurality of flowmeters.

In the third embodiment, the plurality of variable nozzles 86 described in the second embodiment may be used as the exhaust gas flowrate adjustment unit.

Figure 14:
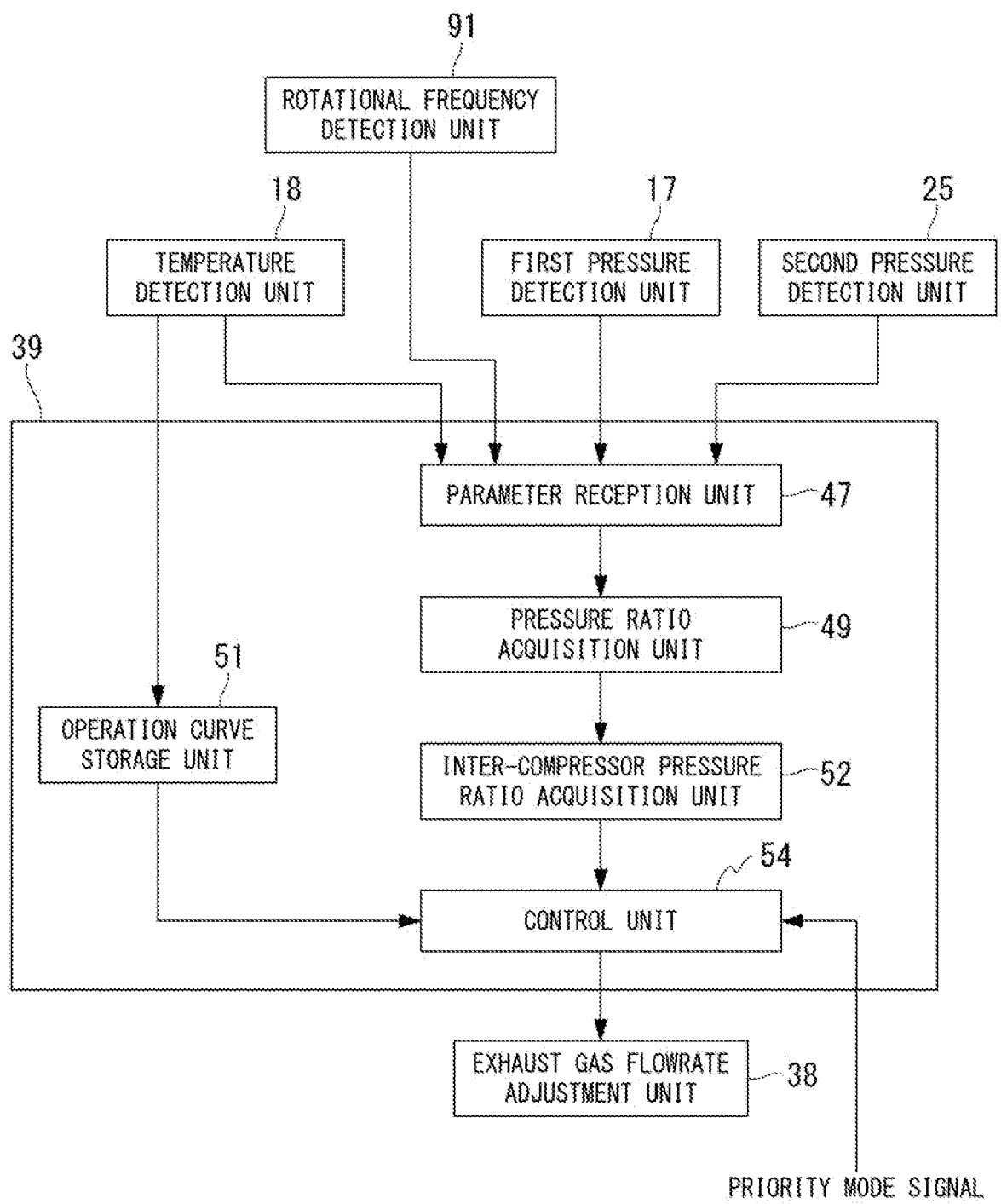
FIG. 14 is a functional block diagram explaining a first modification example of the processing performed by the engine system control apparatus in the third embodiment of the present invention.
Figure 15:
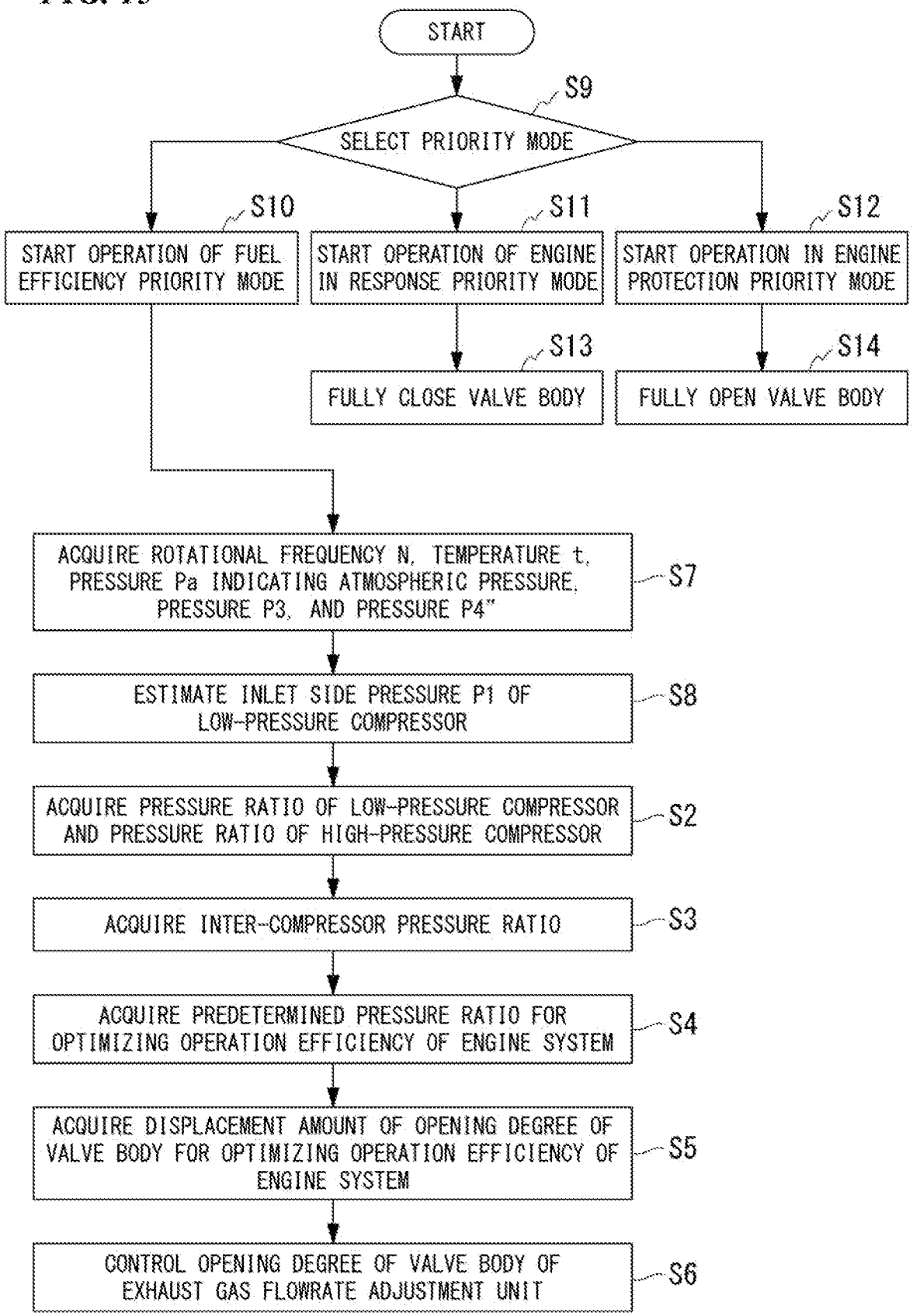
FIG. 15 is a flowchart explaining the first modification example of the processing performed by the engine system control apparatus in the third embodiment of the present invention.

A first modification example of the processing performed by the engine system control apparatus 39 in the third embodiment will be described with reference to FIG. 11, FIG. 14, and FIG. 15. In FIG. 14, the same reference signs will be given to the configuration elements of the structural body illustrated in FIG. 12. In FIG. 15, the same reference signs will be given to the same STEPs (S) configuring the flowchart illustrated in FIG. 13.

As illustrated in FIG. 14, the processing in FIG. 14 is different from the processing performed by the engine system control apparatus 39 in the third embodiment from the viewpoint that a priority mode signal is input to the control unit 54.

The priority mode signal includes a fuel efficiency priority mode signal, a response speed priority mode signal which prioritizes the response speed of the engine 27, and an engine protection priority mode signal. One of the three priority mode signals described above is input to the control unit 54.

When the processing in FIG. 15 is started, in S9, one of the three priority mode signals described above is input to the control unit 54.

In S9, when the fuel efficiency priority mode signal is input to the control unit 54, the process proceeds to S10.

When the response speed priority mode signal is input to the control unit 54, the process proceeds to S11. When the engine protection priority mode signal is input to the control unit 54, the process proceeds to S12.

In S10, an operation of the fuel efficiency priority mode is started. Thereafter, the processing described in FIG. 13 is sequentially performed.

In S11, an operation of the engine 27 in the response priority mode is started. Thereafter, the process proceeds to S13. In S13, the control unit 54 of the engine system control apparatus 39 controls the valve body 44 so as to be in the fully closed state.

In S12, an operation in the engine protection response priority mode is started. Thereafter, the process proceeds to S14. In S14, the control unit 54 of the engine system control apparatus 39 controls the valve body 44 so as to be in the fully open state.

By performing the controls described above by the engine system control apparatus 39, it is possible to perform the operation in accordance with the purpose.

The operation illustrated in FIG. 15 is also applicable to the engine systems 10, 65, 70, and 80 described in the first and second embodiments, and it is possible to obtain the same effects same as those in the third embodiment.

Figure 16:
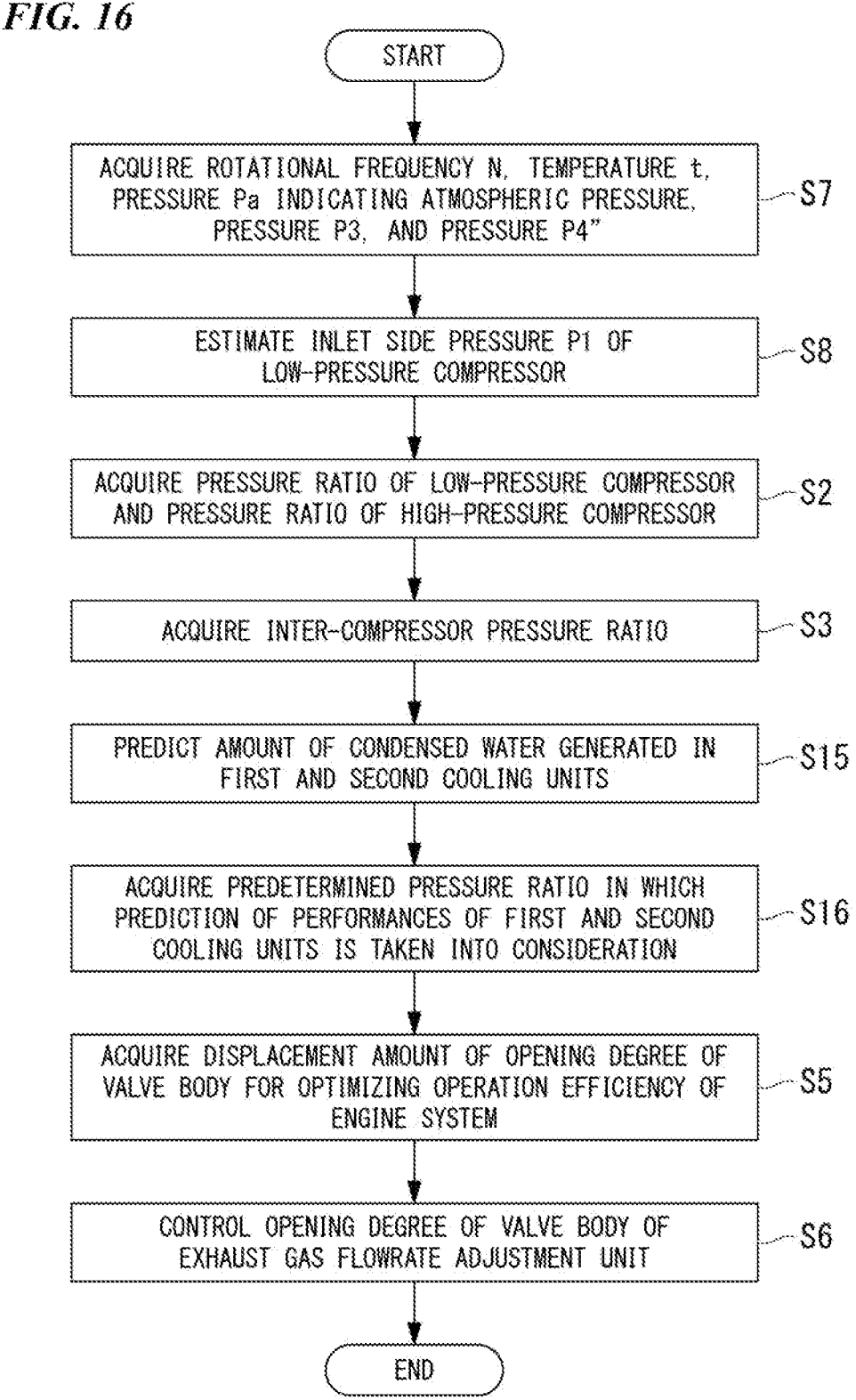
FIG. 16 is a flowchart explaining a second modification example of the processing performed by the engine system control apparatus in the third embodiment of the present invention.

A second modification example of the processing by the engine system control apparatus 39 in the third embodiment will be described with reference to FIG. 11 and FIG. 16. In FIG. 16, the same reference signs will be given to the same STEPs (S) configuring the flowchart illustrated in FIG. 13.

When the processing illustrated in FIG. 16 is started, the processings in S7, S8, S2, S3, and S4 described in FIG. 13 are sequentially performed. Subsequently, in STEP S15, the control unit 54 predicts an amount of condensed water generated in the first and second cooling units 16 and 23.

The amount of condensed water generated is predicted based on the temperature and relative humidity of the air at the inlet side of the engine 27, the pressure ratio of the low-pressure compressor 14, the pressure ratio of the high-pressure compressor 22, the outlet side temperature of the first cooling unit 16, the outlet side temperature of the second cooling unit 23.

Specifically, the amount of condensed water generated is predicted using the method described below.

First, an amount of moisture (hereinafter referred to as "amount of moisture G1") contained in the air at the inlet side of engine 27 is calculated based on a saturated vapor pressure and a relative humidity corresponding to the temperature of the air on the inlet side of engine 27.

Subsequently, an amount of moisture (hereinafter referred to as "amount of moisture G2") contained in the air at the outlet side of the first cooling unit 16 is calculated based on the saturated vapor pressure corresponding to the outlet side temperature of the first cooling unit 16.

The amount of condensed water generated at the outlet side of the first cooling unit 16 can be obtained by subtracting (subtraction calculation) the amount of moisture G2 from the amount of moisture G1.

Using the method described above, an amount of moisture contained in the air at the inlet side of the high-pressure compressor 22 (hereinafter referred to as "amount of moisture G3") is calculated based on the saturated vapor pressure and the relative humidity corresponding to the temperature of the air on the inlet side of the high-pressure compressor 22.

Thereafter, an amount of moisture (hereinafter referred to as "amount of moisture G4") contained in the air at the outlet side of the second cooling unit 23 is calculated from the saturated vapor pressure corresponding to the outlet side temperature of the second cooling unit 23. The amount of condensed water generated at the outlet side of the second cooling unit 23 can be obtained by subtracting (subtraction calculation) the amount of moisture G2 from the amount of moisture G1.

Subsequently, in S16, the predetermined pressure ratio in which the amount of condensed water generated as predicted in S15 is taken into consideration is acquired.

Specifically, the above-mentioned pressure ratio is acquired using the method described above.

First, the amount of heat exchange reduction in the first cooling unit 16 is calculated by multiplying (multiplication calculation) a vaporization latent heat by the amount of condensed water generated (=G1−G2) at the outlet side of the first cooling unit 16.

The amount of heat exchange reduction in the second cooling unit 23 is calculated by multiplying (multiplication calculation) the vaporization latent heat by the amount of condensed water generated (=G3−G4) at the outlet side of the second cooling unit 23.

Subsequently, using the heat exchange amount reduction of the first and second cooling units 16 and 23, a compression ratio of the low-pressure compressor 14 and the pressure ratio of the high-pressure compressor 22 for setting the amount of reduction of heat exchange to a minimum and a pressure ratio of the high-pressure compressor 22 are calculated.

Subsequently, the inter-compressor pressure ratio in which the amount of heat exchange reduction of the first and second cooling units 16 and 23 is taken into consideration is acquired using the compression ratio of the low-pressure compressor 14 and the pressure ratio of the high-pressure compressor 22.

Subsequently, the predetermined pressure ratio for optimizing the operation efficiency of the engine system 10 is acquired based on the operation curve.

Subsequently, in S5, the amount of displacement of the opening degree of the valve body 44 is acquired such that the inter-compressor pressure ratio, in which the performances of the first and second cooling units 16 and 23 predicted in S16 are taken into consideration, optimizes the operation efficiency of the engine system 10.

Thereafter, in S6, the control unit 54 controls the opening degree of the valve body 44 based on the amount of displacement of the opening degree of the valve body 44 acquired in S5.

According to the second modification example of the processing by the engine system control apparatus 39 in the third embodiment, even if the weather conditions (temperature, pressure, humidity, and the like) change or if the performances of the turbochargers 11 and 12, the first cooling unit 16, and the second cooling unit 23 deteriorate over time, it is possible to improve the fuel efficiency of the engine system 90.

Particularly, since the water in the first and second cooling units 16 and 23 may be easily condensed under an operation condition such as high humidity, it is preferable to perform the processing by the engine system control apparatus 39 in the second modification example described above.

The processing by the engine system control apparatus 39 in the second modification example described above is also applicable to the engine systems 10, 65, 70, and 80 described in the first embodiment and the second embodiment.

As described above, preferred embodiments of the present invention have been described in detail. However, the present invention is not limited to such specific embodiments, but can be variously changed or modified within the scope of the present invention described in the scope of the claims.

INDUSTRIAL APPLICABILITY

The present invention is applicable to an engine system control apparatus and an engine system.

REFERENCE SIGNS LIST 10, 65, 70, 80, 90 engine system
11, 12 turbocharger
13 supply line
13A first supply line
13B second supply line
13C third supply line
14 low-pressure compressor
16 first cooling unit
17 first pressure detection unit
18 temperature detection
22 high-pressure compressor
23 second cooling unit
25 second pressure detection unit
27 engine
29 exhaust line
29A first exhaust line
29B second exhaust line
29C third exhaust line
31 low-pressure turbine
33 first rotation shaft
34, 81 high-pressure turbine
36 second rotation shaft
38 exhaust gas flowrate adjustment unit
39 engine system control device
47 parameter reception unit
49 pressure ratio acquisition unit
51 operation curve storage unit
52 inter-compressor pressure ratio acquisition unit
54 control unit
56 input interface
57 memory
59 CPU
61 output interface
82 turbine main body
83 housing
83A introducing port
84 moving blade
86 variable nozzle
A operation curve
B predetermined pressure ratio

The invention claimed is:

1. An engine system control apparatus for control an engine system, the engine system including an engine, a low-pressure compressor configured to compress suction air, a high-pressure compressor configured to further compress the suction air compressed by the low-pressure compressor and supply the resultant to the engine, a high-pressure turbine configured to be driven by exhaust gas discharged from the engine and rotationally drive the high-pressure compressor, a low-pressure turbine configured to be driven by exhaust gas discharged from the high-pressure turbine and rotationally drive the low-pressure compressor, and an exhaust gas flowrate adjustment unit configured to adjust a flowrate of the exhaust gas passing through at least one of the high-pressure turbine and the low-pressure turbine, the engine system control apparatus comprising:

a parameter reception unit configured to receive parameters necessary for acquiring a pressure ratio of the low-pressure compressor and a pressure ratio of the high-pressure compressor;

a pressure ratio acquisition unit configured to acquire the pressure ratio of the low-pressure compressor and the pressure ratio of the high-pressure compressor based on the parameters;

an inter-compressor pressure ratio acquisition unit configured to acquire an inter-compressor pressure ratio obtainable based on the pressure ratio of the low-pressure compressor and the pressure ratio of the high-pressure compressor;

a control unit configured to control the exhaust gas flowrate adjustment unit such that the inter-compressor pressure ratio becomes a predetermined pressure ratio for optimizing an operation efficiency of the engine system; and an operation curve storage unit configured to store operation curves indicating a relationship between the inter-compressor pressure ratio and the operation efficiency of the engine system, wherein the control unit controls the exhaust gas flowrate adjustment unit such that the inter-compressor pressure ratio obtained when the operation efficiency of the engine system is highest among the operation curves becomes the predetermined pressure ratio, wherein the operation curve storage unit is connected to the engine and stores a plurality of operation curves corresponding to a temperature at a predetermined position on a supply line where the low-pressure compressor and the high-pressure compressor are provided, and wherein the control unit uses the operation curve corresponding to the temperature at the predetermined position among the plurality of operation curves.

2. The engine system control apparatus according to claim 1, wherein the parameter reception unit receives an inlet side pressure of the high-pressure compressor and an outlet side pressure of the high-pressure compressor, and wherein the pressure ratio acquisition unit uses the atmospheric pressure as the inlet side pressure of the low-pressure compressor.

3. The engine system control apparatus according to claim 1, wherein the parameter reception unit receives an inlet side pressure of the high-pressure compressor, an outlet side pressure of the high-pressure compressor, the atmospheric pressure, and the rotational frequency of the low-pressure compressor, and wherein the pressure ratio acquisition unit estimates the inlet side pressure of the low-pressure compressor based on the inlet side pressure of the high-pressure compressor, the atmospheric pressure, and the rotational frequency of the low-pressure compressor, and acquires the pressure ratio of the low-pressure compressor based on the estimated inlet side pressure of the low-pressure compressor and the inlet side pressure of the high-pressure compressor.

4. The engine system control apparatus according to claim 1, wherein the control unit controls the exhaust gas flowrate adjustment unit such that the pressure ratio becomes the predetermined pressure ratio when it is desirable to improve the fuel efficiency of the engine system, performs the control on the exhaust gas flowrate adjustment unit to be fully closed when it is desirable to increase the response speed of the engine, and performs the control on the exhaust gas flowrate adjustment unit to be fully open when it is desirable to protect the engine from the compressed suction air discharged from the high-pressure compressor.

5. An engine system, comprising:
the engine system control apparatus according to claim 1;
the engine;
a high-pressure turbocharger including the high-pressure compressor and the high-pressure turbine that are connected to the engine;
a low-pressure turbocharger including the low-pressure compressor and the low-pressure turbine that are connected to the high-pressure turbocharger;
a first rotation shaft connecting the low-pressure compressor and the low-pressure turbine;
a second rotation shaft connecting the high-pressure compressor and the high-pressure turbine;
the exhaust gas flowrate adjustment unit that is electrically connected to the engine system control apparatus;
a supply line that is connected to the engine, and on which the low-pressure compressor and the high-pressure compressor are provided;
an exhaust line that is connected to the engine, and on which the low-pressure turbine and the high-pressure turbine are provided;
a first pressure detection unit configured to detect an inlet side pressure of the high-pressure compressor and transmit information on the detected pressure to the engine system control apparatus; and
a second pressure detection unit configured to detect an outlet side pressure of the high pressure-compressor and transmit information on the detected pressure to the engine system control apparatus.

6. The engine system according to claim 5, further comprising:
a temperature detection unit configured to detect a temperature of the suction air flowing at a predetermined position of the supply line and transmit information on the detected temperature to the engine system control apparatus.

7. The engine system according to claim 5, further comprising:
a rotational frequency detection unit configured to detect the rotational frequency of the first rotation shaft and transmit information on the detected rotational frequency to the engine system control apparatus.

8. The engine system according to claim 5,
wherein the exhaust gas flowrate adjustment unit includes;
a bypass line of which both ends are connected to the exhaust line so as to bypass at least one of the low-pressure turbine and the high-pressure turbine, and
a valve that is provided on the bypass line and electrically connected to the control unit.

9. The engine system according to claim 5,
wherein the low-pressure turbine and the high-pressure turbine each includes a turbine main body, and
wherein the exhaust gas flowrate adjustment unit is a variable nozzle provided inside the turbine main body of at least one of the low-pressure turbine and the high-pressure turbine.

\* \* \* \* \*